(12) United States Patent
Nagahama

(10) Patent No.: US 12,471,380 B2
(45) Date of Patent: Nov. 11, 2025

(54) SEMICONDUCTOR DEVICE

(71) Applicant: RENESAS ELECTRONICS CORPORATION, Tokyo (JP)

(72) Inventor: Ei Nagahama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 604 days.

(21) Appl. No.: 18/055,649

(22) Filed: Nov. 15, 2022

(65) Prior Publication Data

US 2023/0187433 A1   Jun. 15, 2023

(30) Foreign Application Priority Data

Dec. 14, 2021   (JP) .................................. 2021-202105

(51) Int. Cl.
*H10D 89/10*   (2025.01)
*G06F 30/392*   (2020.01)

(52) U.S. Cl.
CPC ........... *H10D 89/10* (2025.01); *G06F 30/392* (2020.01)

(58) Field of Classification Search
CPC ....... H10D 89/10; G06F 30/39; G06F 30/392; G06F 30/394; G06F 30/398; G06F 30/327; G06F 30/337; G06F 30/343
USPC .......................................................... 716/118
See application file for complete search history.

(56) References Cited

U.S. PATENT DOCUMENTS 10,748,933 B2   8/2020   Yadoguchi et al.
2013/0069169 A1*   3/2013   Kwon ................... H10D 89/10
                                                          716/119

FOREIGN PATENT DOCUMENTS

JP   2019-114641 A   7/2019

* cited by examiner

*Primary Examiner* — Paul Dinh
(74) *Attorney, Agent, or Firm* — Rimon P.C.

(57) ABSTRACT

A semiconductor device includes: a logical cell; a spare cell; and a potential fix cell outputting a reference potential used for fixing a potential of an input wiring of the spare cell. The potential fix cell includes: a mutual connection wiring; a first wiring; a second wiring; and an output wiring. The second wiring has a power supply potential, and is wired at a cell boundary between the potential fix cell and an adjacent different cell. The first wiring is wired inside the potential fix cell. The output wiring outputs the reference potential in response to reception of the power supply potential through the second wiring, the mutual connection wiring and the first wiring.

11 Claims, 17 Drawing Sheets

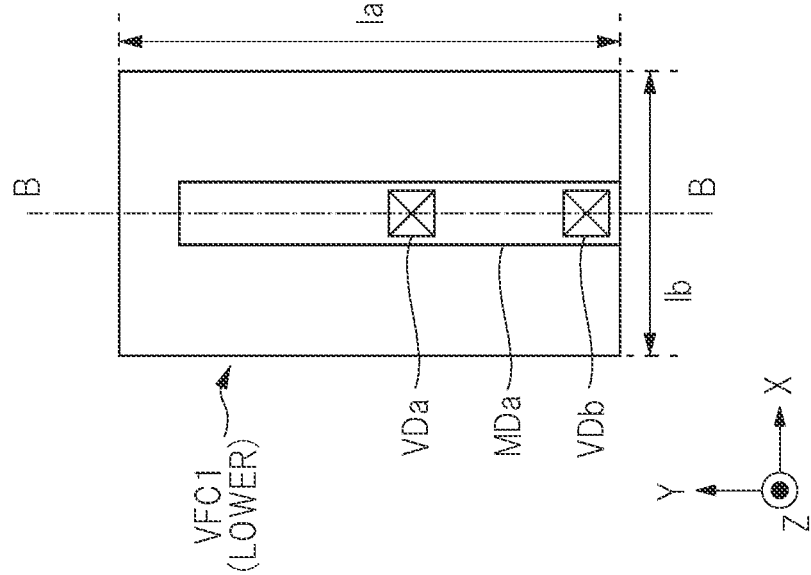
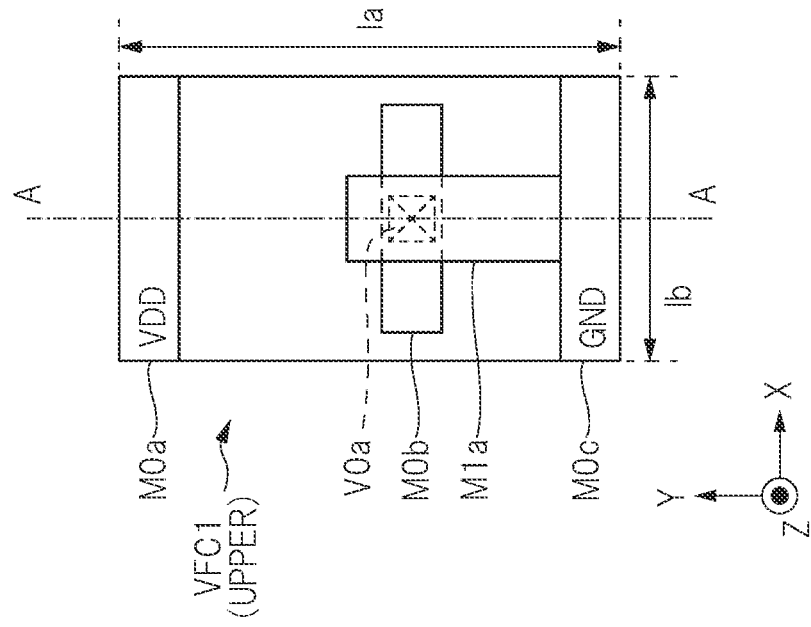

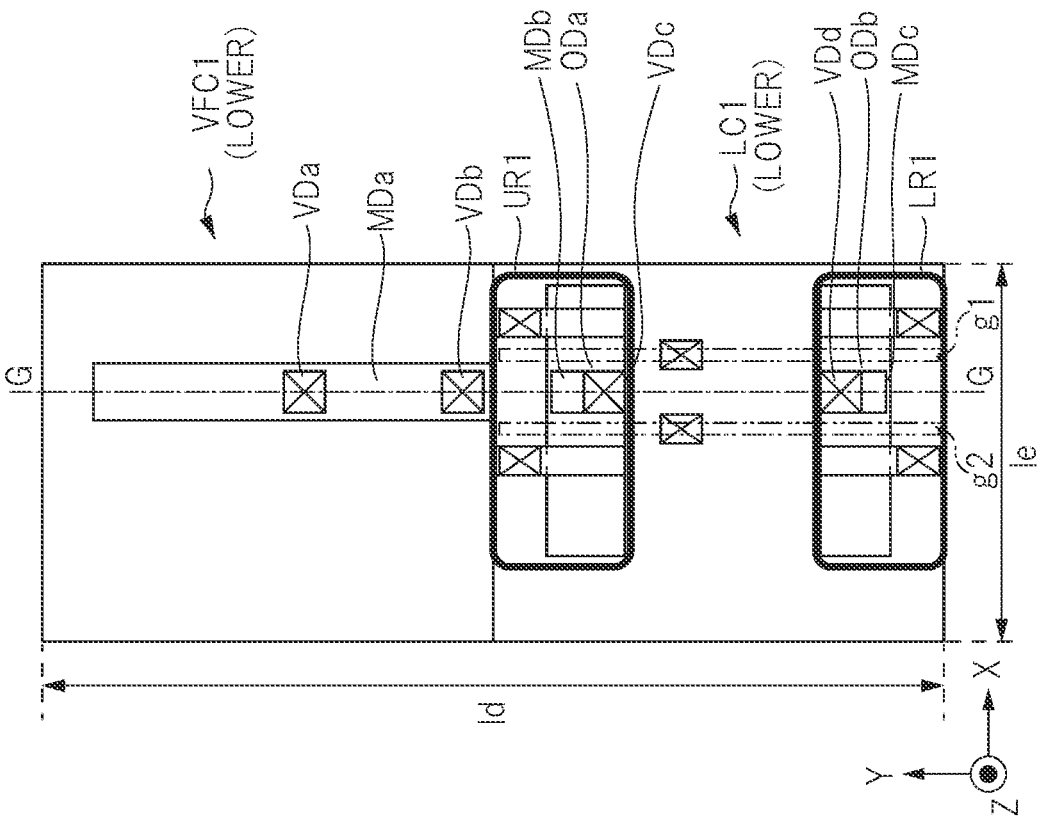
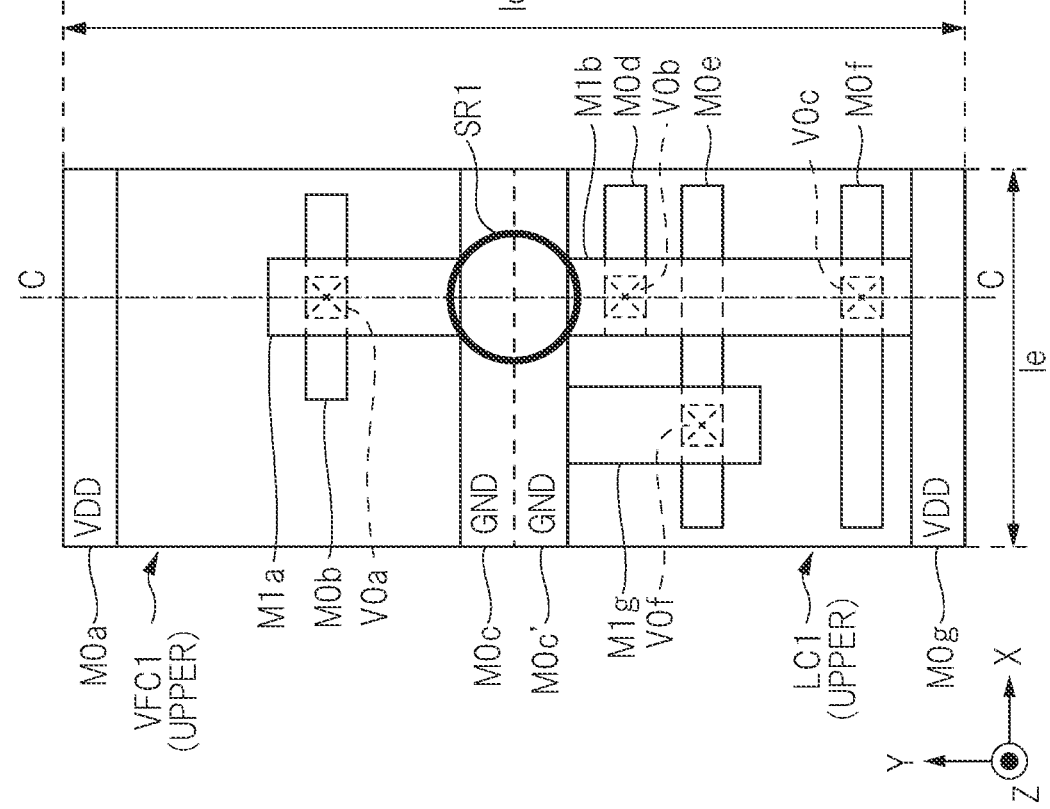
FIG. 3A
FIG. 3B

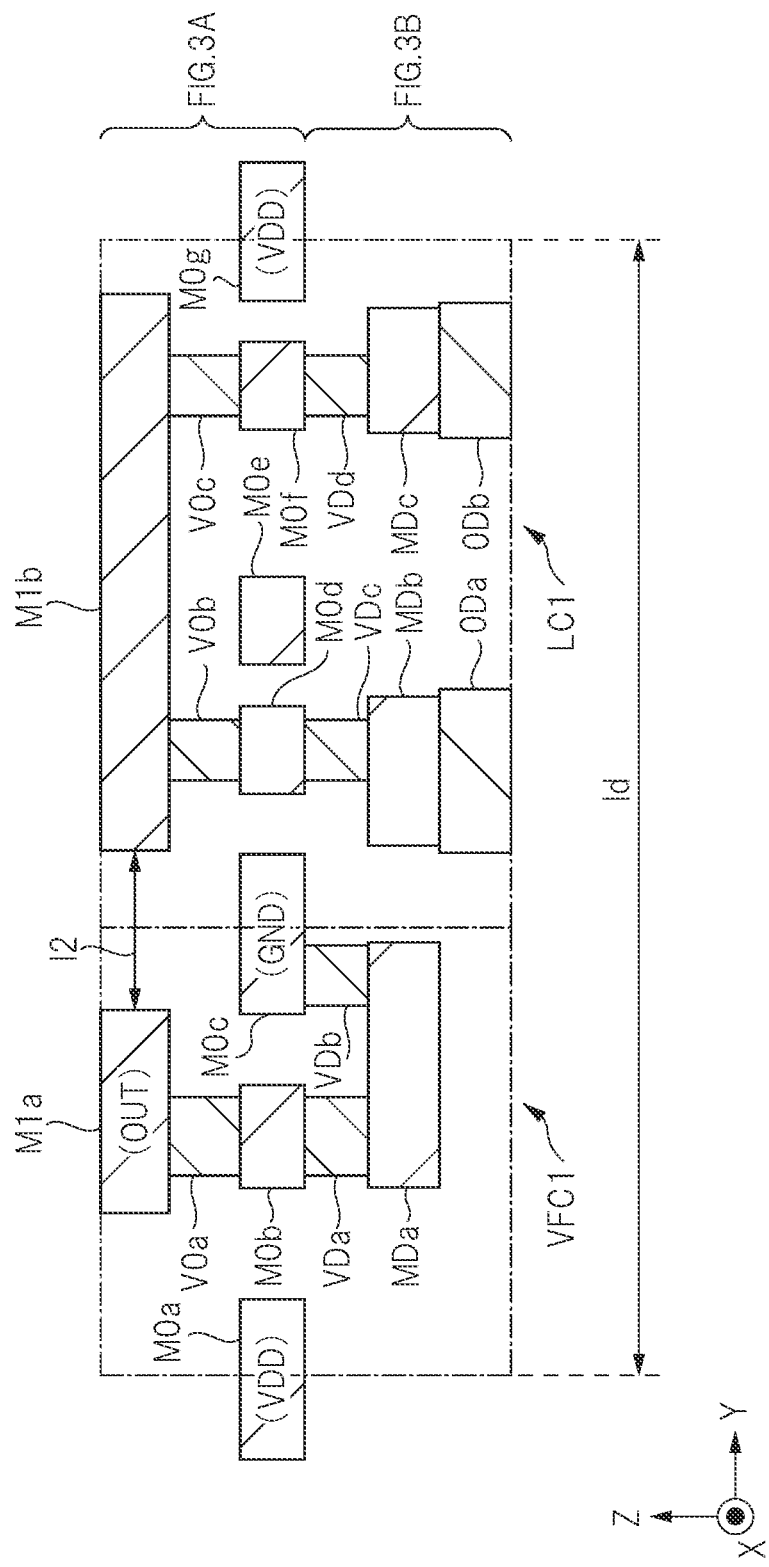

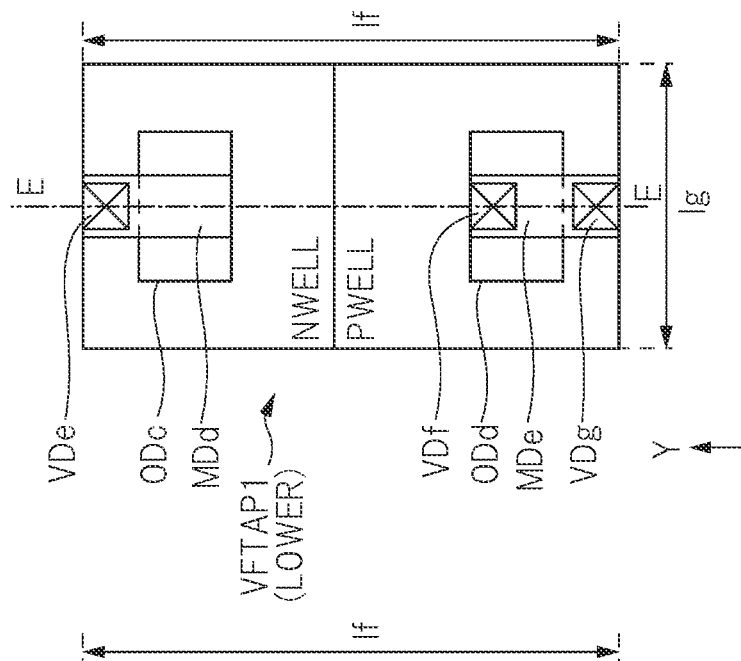
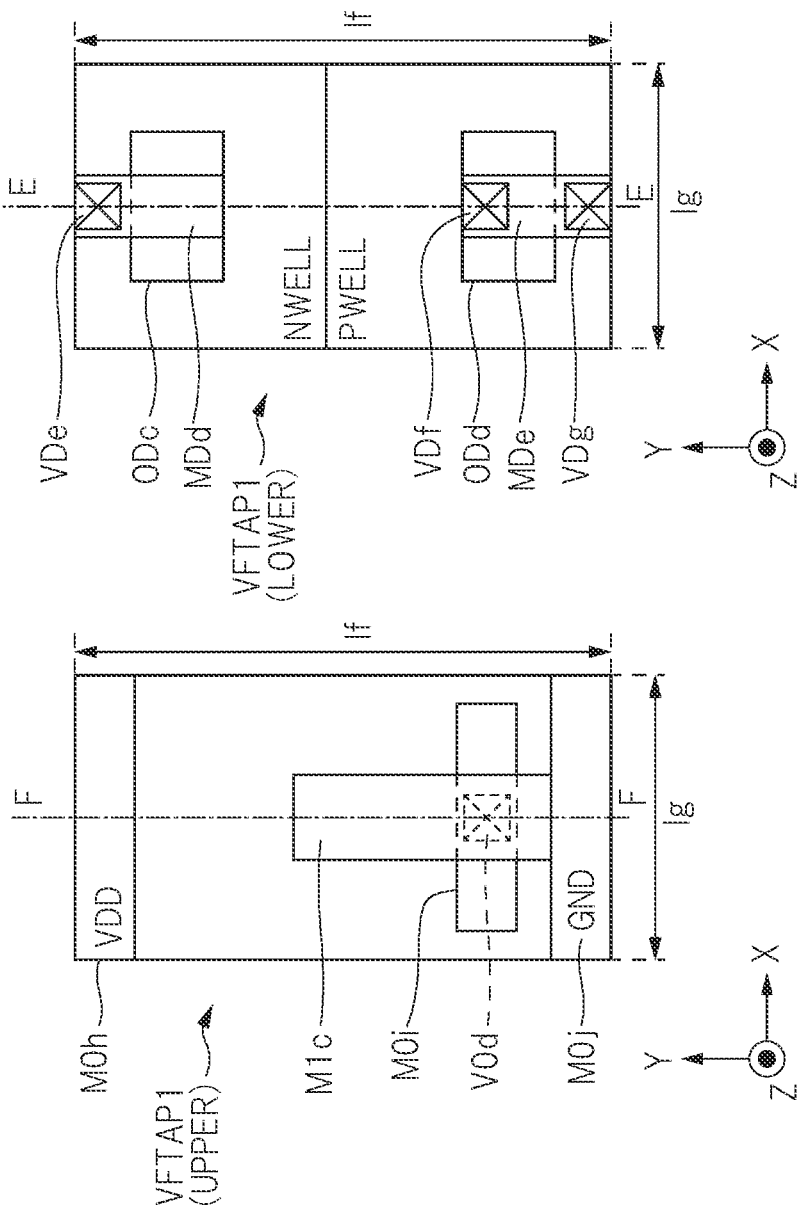

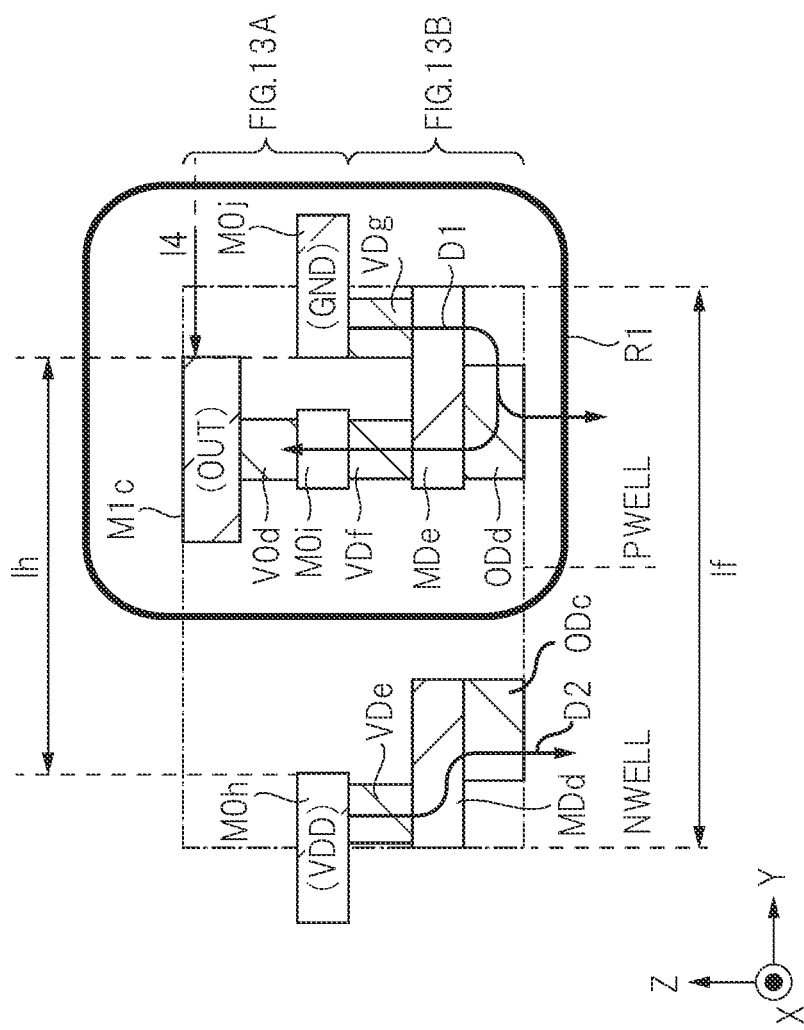

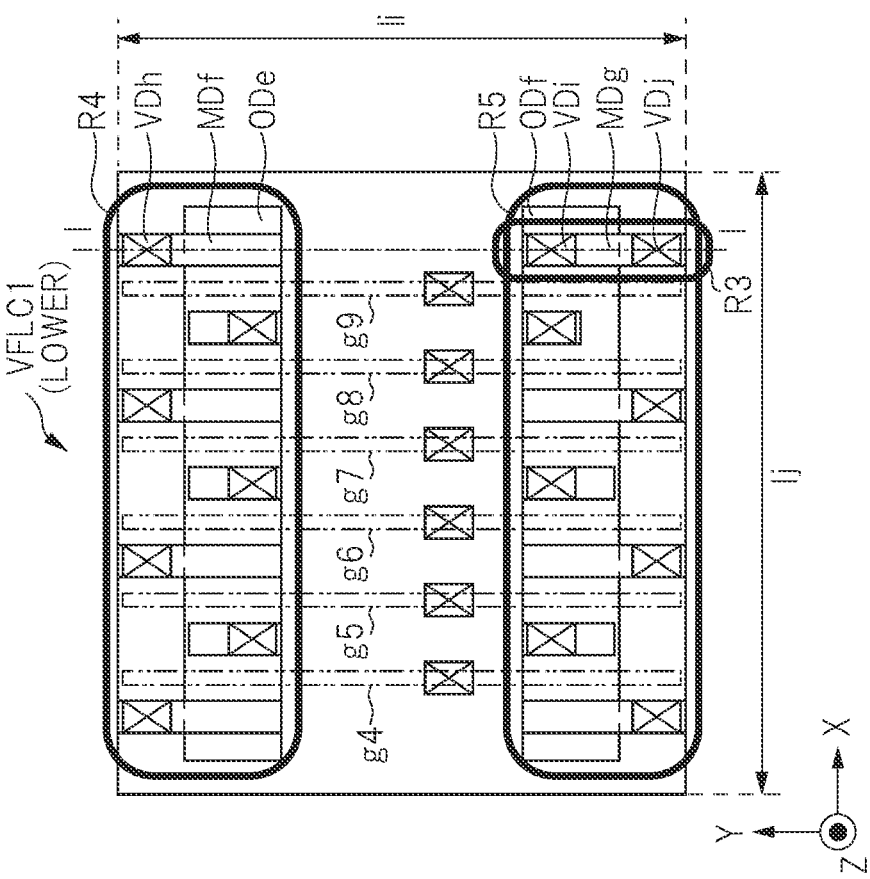
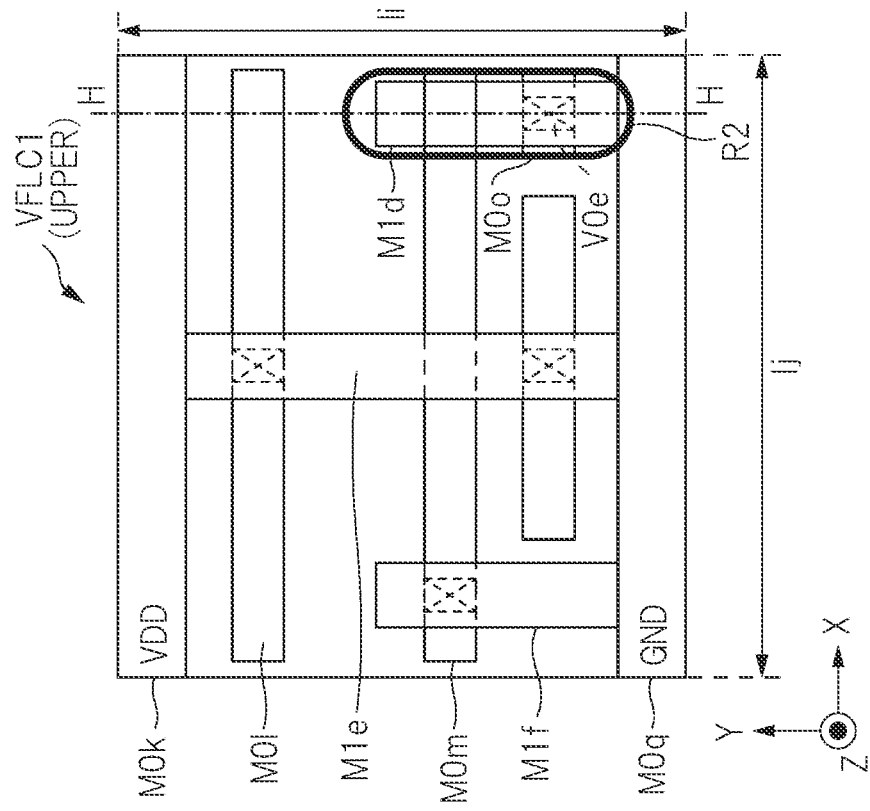
FIG. 15A
FIG. 15B

US 12,471,380 B2

SEMICONDUCTOR DEVICE

CROSS-REFERENCE TO RELATED APPLICATION

The disclosure of Japanese Patent Application No. 2021-202105 filed on Dec. 14, 2021, including the specification, drawings and abstract is incorporated herein by reference in its entirety.

BACKGROUND

The present invention relates to a semiconductor device, and, more particularly relates to a layout of a potential fix cell used for outputting a reference potential to an input wiring of a spare cell of a semiconductor device.

There is disclosed techniques listed below.
[Patent Document 1] Japanese Unexamined Patent Application Publication No. 2019-114641

The Patent Document 1 discloses a technique of preventing a through current from flowing between a drain and a source of a transistor included in a backup logical cell that is called spare cell. As one example of this technique, the Patent Document 1 discloses a configuration in which a gate of the transistor included in the spare cell, that is, an input wiring of the spare cell is electrically connected with a power supply wiring of a semiconductor device.

In design change of the semiconductor device, a cost for the design change is more inexpensive by modification of a wiring layer of an upper layer distant from a semiconductor substrate than modification of a wiring layer of a lower layer close to the semiconductor substrate. For example, the Patent Document 1 discloses a technique of pulling up an input/output wiring of an inverter cell to the wiring layer of the upper layer in a direction of being distant from the semiconductor substrate. In other words, in a course of the design of the semiconductor device, if the design change of the semiconductor device is necessary to change the connection state of the input/output wiring of the inverter cell, the design change can be achieved by only change of a wiring pattern in the wiring layer of the upper layer since the input/output wiring of the inverter cell is pulled up. As a result, a manufacturing cost for the design change can be reduced.

SUMMARY

Meanwhile, in the wiring layer of the lower layer close to the semiconductor substrate, the power supply wiring of the semiconductor device is arranged at a boundary between cells such as the logical cell and the spare cell. In this case, in order to reduce the manufacturing cost for the design change, an output wiring pulled up in a direction of being distant from the semiconductor substrate is preferably arranged even in the power supply wiring connected with the input wiring of the spare cell. In other words, in the course of the design of the semiconductor device, if the design change using the spare cell is necessary, first, it is necessary to disconnect the power supply wiring and the input wiring of the spare cell arranged for the through-current preventing measures. In this case, if not only the input wiring of the spare cell but also the output wiring of the power supply wiring connected with this input wiring are pulled up in the direction of being distant from the semiconductor substrate, the disconnection between the power supply wiring and the input wiring of the spare cell can be achieved by only change of the wiring pattern in the wiring layer of the upper layer distant from the semiconductor substrate. However, if the output wiring of the power supply wiring at the cell boundary is simply arranged at a position pulled up from the power supply wiring in the direction toward the upper layer, a high risk of occurrence of spacing error arises between the pulled-up output wiring and a wiring of an adjacent different cell.

Other problems and novel characteristics will be apparent from the description of the present specification and the accompanying drawings.

According to an embodiment, a semiconductor device includes: a logical cell; a spare cell configuring a new logical function in combination with the logical cell in event of design change; and a potential fix cell outputting a reference potential used for fixing a potential of an input wiring of the spare cell. The potential fix cell includes a mutual connection wiring; a first wiring formed in an upper layer of the mutual connection wiring and connected with the mutual connection wiring; a second wiring formed in an upper layer of the mutual connection wiring and connected with the mutual connection wiring; and an output wiring formed in an upper layer of the first wiring and connected with the first wiring. The second wiring has a power supply potential, and is wired at a cell boundary between the potential fix cell and an adjacent different cell, in a lower layer of the output wiring.

According to an embodiment, in layout of the potential fix cell used for outputting the reference potential to the spare cell, spacing error caused between the potential fix cell and the adjacent different cell can be suppressed.

BRIEF DESCRIPTIONS OF THE DRAWINGS

FIG. 1A is a plan view showing an example of a layout of a potential fix cell according to a first embodiment.

FIG. 1B is a plan view showing an example of the layout of the potential fix cell according to the first embodiment.

FIG. 3A is a plan view showing an example of a layout of a potential fix cell and a logical cell that are adjacently arranged, according to the first embodiment.

FIG. 3B is a plan view showing an example of the layout of the potential fix cell and the logical cell that are adjacently arranged, according to the first embodiment.

FIG. 4 is a cross-sectional view showing an example of the layout of the potential fix cell and the logical cell that are adjacently arranged, according to the first embodiment.

FIG. 13A is a plan view showing an example of a layout of a tap cell with a potential fix function according to the second embodiment.

FIG. 13B is a plan view showing an example of a layout of a tap cell with a potential fix function according to the second embodiment.

FIG. 14 is a cross-sectional view showing an example of a layout of a tap cell with a potential fix function according to the second embodiment.

FIG. 15A is a plan view showing a layout of a logical cell with a potential fix function according to a third embodiment.

FIG. 15B is a plan view showing the layout of the logical cell with the potential fix function according to the third embodiment.

DETAILED DESCRIPTION

Figure 2:
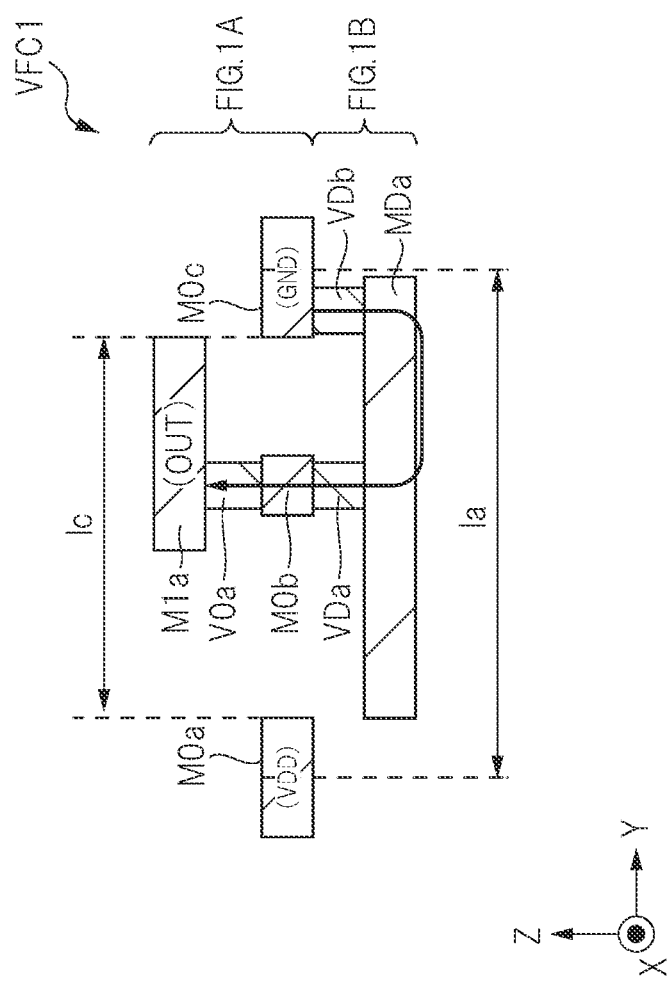
FIG. 2 is a cross-sectional view showing an example of the layout of the potential fix cell according to the first embodiment.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Although not particularly limited, a semiconductor device configuring each functional block of embodiments is formed on a semiconductor substrate made of single crystal silicon or others by an integrated circuit technique such as a publicly-known CMOS (Complementary MOS transistor). As examples of a circuit element, elements such as a resistor, a capacitor and a coil are exemplified.

Hereinafter, embodiments of the present invention will be described in detail with reference to the accompanying drawings. Note that the same components are denoted by the same reference signs throughout all the drawings for explaining the embodiments, and the repetitive description thereof will be omitted. Further, a size scale in the drawing is emphasized for convenience of explanation, and may be different from a practical size scale. Note that a wiring layer in a plan surface closest to the semiconductor device such as the transistor formed in the semiconductor substrate of the semiconductor device is the mutual connection layer made of a conductor such as metal. A wiring layer in an upper layer of the mutual connection layer is a metal zero-th layer. A wiring layer in an upper layer of the metal zero-th layer is a metal first layer. A wiring layer in an upper layer of the metal first layer is a metal second layer. A wiring layer in an upper layer of the metal second layer is a metal third layer. As described above, except for the mutual connection layer in the lowest layer, a wiring layer in an upper layer means a wiring layer numbered to have a larger number than that of a comparative target wiring layer. Therefore, the number of a metal layer in a plan surface in the direction of being distant from the semiconductor device is sequentially a larger number. And, for convenience of explanation, an XYZ orthogonal coordinate system is adopted. One and the other directions that are orthogonal to each other on a plane surface in parallel to a sheet of the drawing and a direction orthogonal to the sheet of the drawing are expressed by an X-axis direction, a Y-axis direction and a Z-axis direction, respectively.

First Embodiment

<Configuration of Potential Fix Cell of Semiconductor Device>

Each of FIGS. 1A and 1B is a plan view showing an example of a layout of a potential fix cell according to a first embodiment. FIG. 1A shows a wiring portion close to an upper layer of the potential fix cell. FIG. 1B shows a wiring portion close to a lower layer of the potential fix cell. A length of the potential fix cell VFC1 in the X-axis direction is "1b", and a length of the same in the Y-axis direction is "1a". On the X-Y plane, a dashed dotted line A-A of FIG. 1A and a dashed dotted line B-B of FIG. 1B overlap each other.

The potential fix cell VFC1 (UPPER) of FIG. 1A includes a first wiring M0b, a via V0a, a second wiring M0c, a third wiring M0a, and an output wiring M1a. The first wiring M0b, the second wiring M0c and the third wiring M0a are formed in the metal zero-th layer. The output wiring M1a is formed in the metal first layer that is an upper layer of the metal zero-th layer. The via V0a is formed between the metal zero-th layer and the metal first layer. The via V0a electrically connects the first wiring M0b and the output wiring M1a. Note that the metal first layer is positioned to be closer to the Z-axis direction than the metal zero-th layer in FIG. 1A. The second wiring M0c is a GND wiring having a GND potential. The third wiring M0a is a VDD wiring having a VDD potential. The VDD wiring and the GND wiring are collectively called power supply wiring. Therefore, the second wiring and the third wiring are also called a first power supply wiring and a second power supply wiring. The first power supply wiring and the second power supply wiring are arranged at a cell boundary between cells included in the semiconductor device. The first power supply wiring supplies the GND potential, that is a first power supply potential, to the cell included in the semiconductor device. The second power supply wiring supplies the VDD potential, that is a second power supply potential, to the cell included in the semiconductor device.

The potential fix cell VFC1 (LOWER) of FIG. 1B includes a mutual connection wiring MDa, a via VDa and a via VDb. The mutual connection wiring MDa is electrically connected with the via VDa and the via VDb formed from the mutual connection wiring MDa in the +Z-axis direction.

Note that the potential fix cell is a cell outputting a reference potential used for suppressing a through current from flowing in the transistor included in the spare cell. Specifically, the output wiring of the potential fix cell is connected with the input wiring of the spare cell (the gate of the transistor), and supplies the potential (reference potential) corresponding to the first power supply potential or the second power supply potential. In this manner, a potential of the input wiring of the spare cell (the gate of the transistor) is fixed to a predetermined potential to suppress the through current from flowing in the spare cell. In FIG. 1, the output wiring M1a of the potential fix cell VFC1 outputs the potential (reference potential) corresponding to the GND potential. The output wiring M1a of the potential fix cell VFC1 is connected with the gate (input wiring) of the transistor included in a spare cell not illustrated, and the potential of the input wiring of the spare cell is fixed by the reference potential output from the potential fix cell VFC1.

FIG. 2 is a cross-sectional view showing an example of a layout of the potential fix cell VFC1 according to the first embodiment. FIG. 2 shows cross-sectional views on the dashed dotted line A-A of FIG. 1A and the dashed dotted line B-B of FIG. 1B. Therefore, FIG. 2 includes the A-A cross section of FIG. 1A on an upper side and the B-B cross section of FIG. 1B on a lower side.

In FIG. 2, the mutual connection wiring MDa made of a metal or others is electrically connected with the first wiring M0b of the metal zero-th layer through the via VDa. The first wiring M0b of the metal zero-th layer is electrically connected with the output wiring M1a of the metal first layer through the via V0a. And, in FIG. 2, the mutual connection wiring MDa is electrically connected with the second wiring M0c of the metal zero-th layer through the via VDb. Note that the second wiring M0c is the GND wiring as described above.

Therefore, as shown with an arrow in FIG. 2, the second wiring M0c of the metal zero-th layer included in the potential fix cell VFC1 of the semiconductor device according to the first embodiment is electrically connected with the output wiring M1a of the metal first layer. In other words, the second wiring M0c that is the GND wiring is electrically connected with the mutual connection wiring MDa through the via VDb. The mutual connection wiring MDa is electrically connected with the first wiring M0b through the via VDa. Further, the first wiring M0b is electrically connected with the output wiring M1a through the via V0a. In this manner, the output wiring M1a is electrically connected with the GND wiring.

Therefore, the output wiring M1a of the potential fix cell VFC1 according to the first embodiment is formed in the metal first layer so as to put the wiring M0b therebetween. In this case, the wiring can be pulled out to the layer such as the metal second layer or the metal third layer upper than the output wiring M1a. In other words, in the metal second layer or upper, the output wiring M1a can be electrically connected with the input wiring connected with the gate of the transistor of the not-illustrated spare cell.

In the first embodiment, note that the mutual connection wiring MDa is electrically connected with the GND wiring. However, the mutual connection wiring MDa can be also electrically connected with the third wiring M0a through not-illustrated another via instead of the second wiring M0c. The third wiring M0a is the VDD wiring having the VDD potential. When the mutual connection wiring MDa is electrically connected with the third wiring M0a, the output wiring M1a is electrically connected with the VDD wiring, and outputs the reference potential corresponding to the VDD potential.

The via VDa, the first wiring M0b, the via V0a and the output wiring M1a can move on the mutual connection wiring MDa in a range of "1c" in the Y-axis direction while keeping the electrical connection relation.

<Configuration of Potential Fix Cell and Logical Cell (in Case of Inverter) of Semiconductor Device>

Each of FIGS. 3A and 3B is a plan view showing an example of a layout of the potential fix cell and the logical cell that are adjacently arranged in the Y-axis direction, according to the first embodiment. FIG. 3A shows an upper layer portion of the wiring where the potential fix cell and the logical cell are adjacently arranged, and FIG. 3B shows a lower layer portion. Each length of the potential fix cell VFC1 and the logical cell LC1 in the X-axis direction is "1e". A total of lengths of the potential fix cell VFC1 and the logical cell LC1 in the Y-axis direction is "1d". On the X-Y plane, a dashed dotted line C-C of FIG. 3A and a dashed dotted line G-G of FIG. 3B overlap each other. A logical cell can have various functions, and the logical cell LC1 according to the first embodiment has a function serving as an inverter. A circuit configuration serving as the inverter of the logical cell LC1 according to the first embodiment will be described later.

Note that detailed explanation for each plan view of the potential fix cell VFC1 of FIGS. 3A and 3B is omitted since the explanation has been made in FIGS. 1A and 1B.

A logical cell LC1 (UPPER) of FIG. 3A includes a wiring M0c', a wiring M0d, a wiring M0e, a wiring M0f, a wiring M0g, an input wiring M1g, an output wiring M1b, a via V0b, a via V0c and a via V0f. The wiring M0c', the wiring M0d, the wiring M0e, the wiring M0f and the wiring M0g are formed in the metal zero-th layer. The input wiring M1g and the output wiring M1b are formed in the metal first layer that is the upper layer of the metal zero-th layer. The via V0b, the via V0c and the via V0f are formed between the metal zero-th layer and the metal first layer.

The wiring M0d of the metal zero-th layer of the logical cell LC1 of FIG. 3A is electrically connected with the output wiring M1b of the logical cell LC1. The wiring M0f of the metal zero-th layer of the logical cell LC1 is also electrically connected with the output wiring M1b of the logical cell LC1 through the via V0c. The wiring M0e of the metal zero-th layer of the logical cell LC1 is also electrically connected with the input wiring M1g that is the input wiring of the logical cell LC1 through the via V0f. Note that the second wiring M0c and the wiring M0c' of the metal zero-th layer are the GND wirings. A broken line between the second wiring M0c and the wiring M0c' indicates the cell boundary. The wiring M0g of the metal zero-th layer is the VDD wiring.

The input wiring M1g of the logical cell LC1 is an input terminal of the logical cell LC1 serving as the inverter. The output wiring M1b of the logical cell LC1 is an output terminal of the logical cell LC1 serving as the inverter.

Two parallel-connected NMOS transistors are formed in a region UR1 of the logical cell LC1 (LOWER) of FIG. 3B. Two parallel-connected PMOS transistors are formed in a region LR1 of the logical cell LC1 (LOWER) of FIG. 3B. The potential fix cell VFC1 and the logical cell LC1 are formed on a semiconductor substrate not illustrated. The semiconductor substrate includes a P-type well (P-type semiconductor layer) doped with a P-type impurity and an N-type well (N-type semiconductor layer) doped with an N-type impurity. The region UR1 of the logical cell LC1 is included in a region of the P-type well not illustrated, and the region LR1 of the logical cell LC1 is included in a region of the N-type well not illustrated. Therefore, the two NMOS transistors of the logical cell LC1 are formed in the region of the P-type well, and the two PMOS transistors of the logical cell LC1 are formed in the region of the N-type well.

Gate electrodes g1 and g2, an N-type diffusion region ODa, a mutual connection wiring MDb and a via VDc are included in the region UR1 of the logical cell LC1 of FIG. 3B. In the region UR1, the gate electrode g1 and g2 are formed in an upper layer of the P-type well not illustrated so as to put an insulating layer therebetween. The N-type diffusion region ODa is formed in a surface layer of the P-type well not illustrated by the doping with the N-type impurity, and is formed on both sides of the gate electrodes g1 and g2 on the X-Y plane. In other words, the N-type diffusion region ODa is arranged so as to sandwich the region of the P-type well covered with the gate electrodes g1 and g2. The N-type diffusion region ODa functions as a drain (D) or a source (S) of the NMOS transistor. A portion of the N-type diffusion region ODa sandwiched by the gate electrode g1 and the gate electrode g2 is electrically connected with the mutual connection wiring MDb of the mutual connection layer in the upper layer of the N-type diffusion region ODa. The via VDc electrically connects the mutual connection wiring MDb and the wiring M0d of FIG. 3A. Therefore, the portion of the N-type diffusion region ODa sandwiched by the gate electrode g1 and the gate electrode g2 functions as the drain (D) of the NMOS transistor, and is connected with the output of the inverter (logical cell). On the other hand, a portion of the N-type diffusion region ODa not sandwiched by the gate electrode g1 and the gate electrode g2 is electrically connected with the wiring M0c' through the via. Therefore, the portion of the N-type diffusion region ODa not sandwiched by the gate electrode g1 and the gate electrode g2 functions as the source (S) of the NMOS transistor, and receives the GND potential.

Gate electrodes g1 and g2, a P-type diffusion region ODb, a mutual connection wiring MDc and a via VDd are included in the region LR1 of the logical cell LC1 of FIG. 3B. In the region LR1, the gate electrodes g1 and g2 are formed in an upper layer of the N-type well not illustrated so as to put an insulating layer therebetween. The P-type diffusion region ODb is formed in a surface layer of the N-type well not illustrated by the doping with the P-type impurity, and is formed on both sides of the gate electrodes g1 and g2 on the X-Y plane. In other words, the N-type diffusion region ODa is arranged so as to sandwich the region of the P-type well covered with the gate electrodes g1 and g2. The N-type diffusion region ODa functions as a drain (D) or a source (S) of the NMOS transistor. A portion of the N-type diffusion region ODa sandwiched by the gate electrode g1 and the gate electrode g2 is electrically connected with the mutual connection wiring MDb of the mutual connection layer in the upper layer of the N-type diffusion region ODa. The via VDc electrically connects the mutual connection wiring MDb and the wiring M0d of FIG. 3A. Therefore, the portion of the N-type diffusion region ODa sandwiched by the gate electrode g1 and the gate electrode g2 functions as the drain (D) of the NMOS transistor, and is connected with the output of the inverter (logical cell). On the other hand, a portion of the P-type diffusion region ODb not sandwiched by the gate electrode g1 and the gate electrode g2 is electrically connected with the wiring M0g through the via. Therefore, the portion of the N-type diffusion region ODa not sandwiched by the gate electrode g1 and the gate electrode g2 functions as the source (S) of the NMOS transistor, and receives the GND potential.

As shown in FIG. 3, the gate electrode g1 and the gate electrode g2 are common gate electrodes because of the N-type transistor and the P-type transistor. The gate electrode g1 and the gate electrode g2 are connected with the input wiring M1g through the via and the wiring M0e.

FIG. 4 is a cross-sectional view showing an example of a layout of the potential fix cell and the logical cell that are adjacently arranged in FIG. 3A and FIG. 3B according to the first embodiment. FIG. 4 shows cross sections on a dashed dotted line C-C of FIG. 3A and a dashed dotted line G-G of FIG. 3B. Therefore, FIG. 4 includes the cross section on the dashed dotted line C-C of FIG. 3 on an upper side and the cross section on the dashed dotted line G-G on a lower side. Detailed explanation for a cross section of the potential fix cell VFC1 of FIG. 4 is omitted since the cross section is equivalent to the cross section of the potential fix cell VFC1 of FIG. 2. The cross section of the logical cell LC1 of FIG. 4 is a cross section of an output portion of the inverter made of the NMOS transistor and the PMOS transistor.

The N-type diffusion region ODa functioning as the drain (D) of the NMOS transistor of FIG. 4 is electrically connected with the mutual connection wiring MDb. The mutual connection wiring MDb is electrically connected with the wiring M0d through the via VDc. The wiring M0d is electrically connected with the output wiring M1b through the via V0b. The P-type diffusion region ODb functioning as the drain (D) of the PMOS transistor is electrically connected with the mutual connection wiring MDc. The mutual connection wiring MDc is electrically connected with the wiring M0f through the via VDd. The wiring M0f is electrically connected with the output wiring M1b through the via V0c. The wiring M0d and the wiring M0f are wired in the metal zero-th layer. The output wiring M1b is wired in the metal first layer.

In this case, as shown in FIG. 4, a distance in the Y-axis direction between the output wiring M1a of the potential fix cell VFC1 and the output wiring M1b of the logical cell LC1 is assumed to be "12". If the distance 12 is small, there is a risk of occurrence of design rule error (spacing error). In other words, it is important to sufficiently secure the distance between the output wiring of the potential fix cell and the wiring of the adjacent logical cell. In FIG. 3A, note that a portion corresponding to the distance 12 of FIG. 4 is shown as a region SRI.

Figure 5:
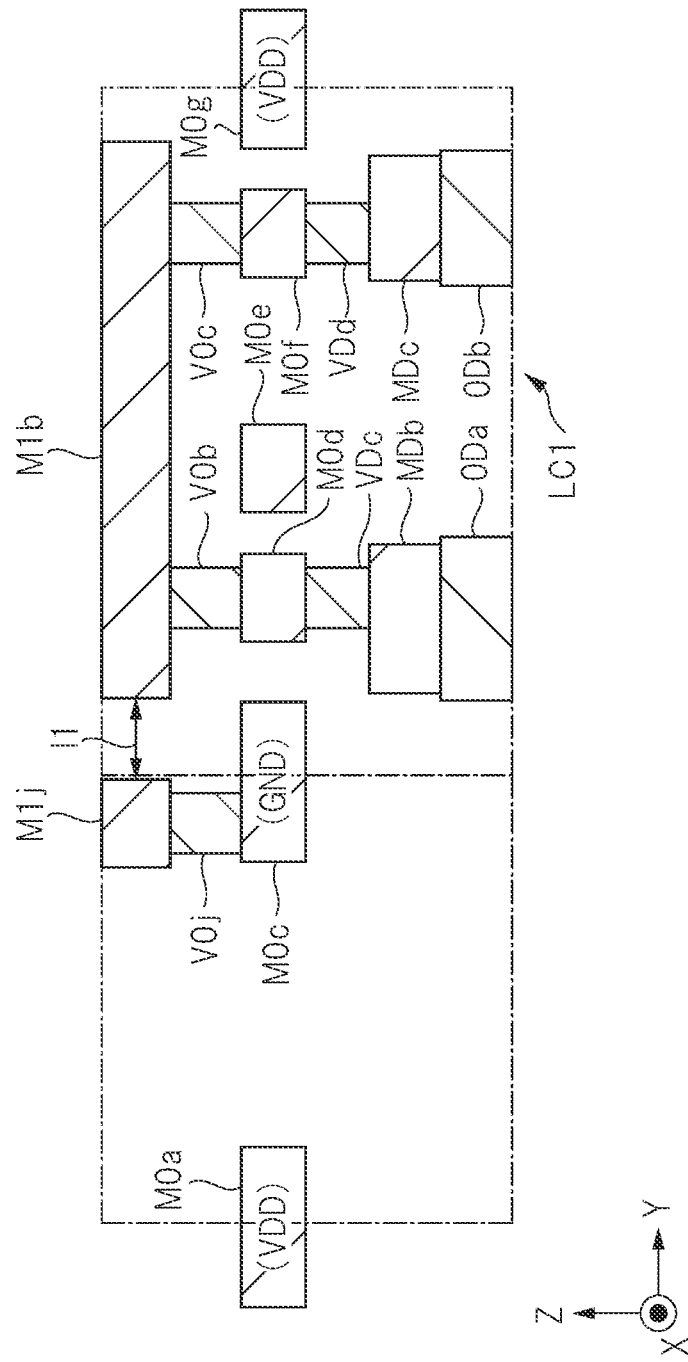
FIG. 5 is a cross-sectional view showing an example of a layout of a potential fix cell and a logical cell that are adjacently arranged, according to a comparative example.

An example (comparative example) of a layout highly possibly causing the occurrence of design rule error (spacing error) is shown in FIG. 5. The potential fix cell shown in FIG. 5 (on the left side of FIG. 5) includes an output wiring M1j outputting the reference potential to the input wiring of the spare cell not shown. As shown in FIG. 5, the output wiring M1j is formed above the second wiring (GND wiring) M0c of the metal zero-th layer. Specifically, the output wiring M1j is formed above the GND wiring M0c to extend from the GND wiring M0c through the via V0j.

In this case, as shown in FIG. 5, a distance between the output wiring M1j of the potential fix cell and the output wiring M1b of the logical cell LC1 is assumed to be a distance "11". In the potential fix cell shown in FIG. 5, the output wiring M1j outputting the reference potential to the spare cell not shown can be easily formed to have a simple structure. However, the distance 11 of FIG. 5 becomes shorter than the distance 12 of FIG. 4, and the possibility of the occurrence of design rule error (spacing error) becomes high.

As described above, at the position being pulled up in the direction of being distant from the semiconductor substrate, the potential fix cell of the semiconductor device according to the first embodiment includes the output wiring for outputting the reference potential to the input wiring of the spare cell. Therefore, even if the design change using the spare cell is necessary for the logical change or the logical correction in the course of the design of the semiconductor device, this design change can be achieved by only the change of the wiring pattern of the wiring layer in the upper layer at the position distant from the semiconductor substrate. Further, the potential fix cell of the semiconductor device according to the first embodiment includes the output wiring for outputting the reference potential at a position not being immediately above the power supply wiring positioned at the cell boundary but being distance from the cell boundary, that is a position shifting into the potential fix cell. In this manner, in the potential fix cell of the semiconductor device according to the first embodiment, the occurrence of the spacing error between the potential fix cell and an adjacent different cell (logical cell) can be more suppressed than that of the potential fix cell according to the comparative example in which the output wiring is positioned immediately above the power supply wiring positioned at the cell boundary.

<Equivalent Circuit of Logical Cell LC1 of FIG. 3>

Figure 6:
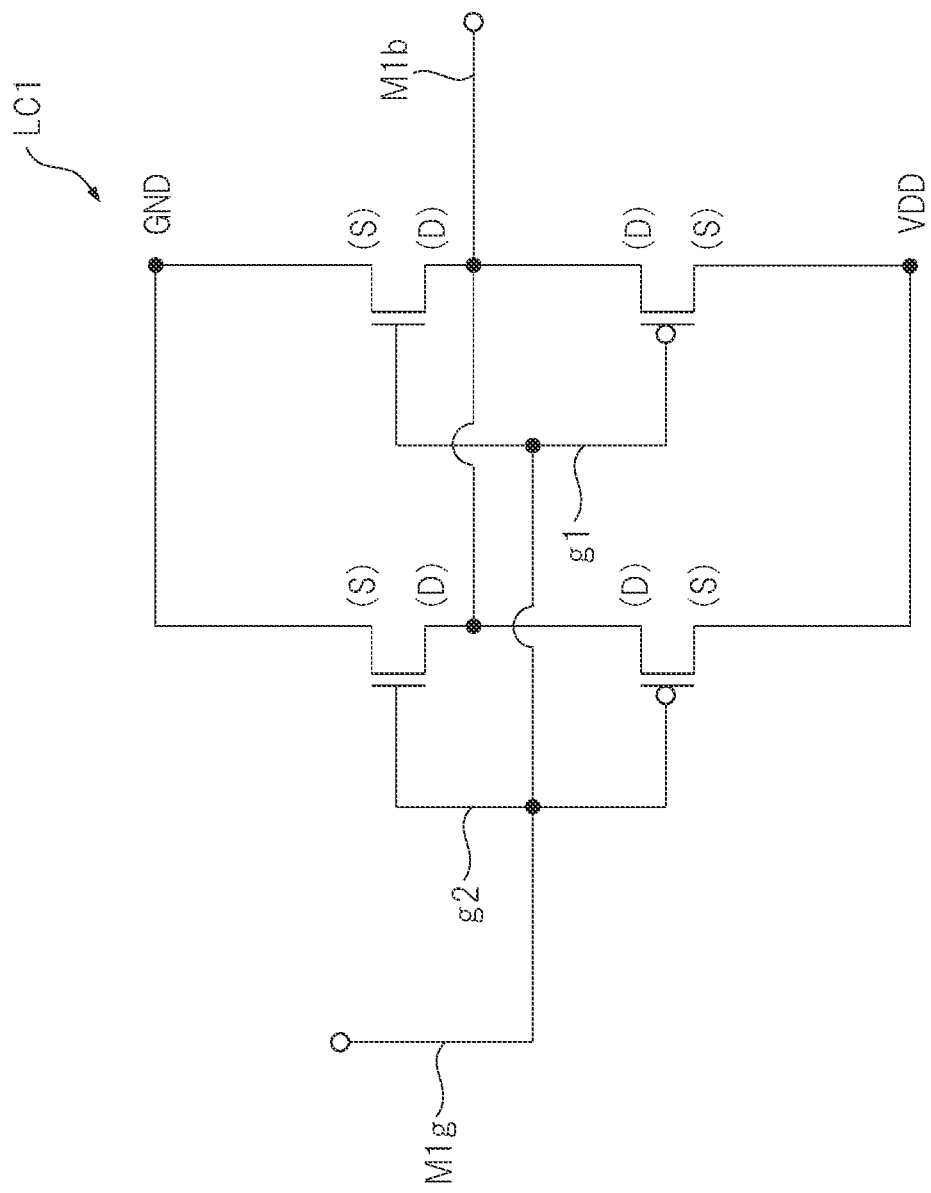
FIG. 6 is a circuit diagram showing an example of an equivalent circuit of the logical cell according to the first embodiment.

FIG. 6 is an example of an equivalent circuit diagram of the logical cell LC1 according to the first embodiment. As described above, the logical cell LC1 shown in FIG. 3A and FIG. 3B is a logical cell including two parallel-arranged inverters made of a combination of the NMOS transistor and the PMOS transistor.

The gate electrode g1 functions as a common gate electrode serving as a gate of the NMOS transistor and a gate of the PMOS transistor. The gate electrode g2 also functions as a common gate electrode serving as a gate of another NMOS transistor and a gate of another PMOS transistor. The input wiring M1g that is the input wiring of the logical cell is electrically connected with the gate electrode g1 and the gate electrode g2. A drain (D) of the NMOS transistor and a drain (D) of the PMOS transistor are electrically connected with each other. The output wiring M1b is electrically connected with the drain (D) of the NMOS transistor and the drain (D) of the PMOS transistor. A source (S) of the NMOS transistor is electrically connected with the wiring M0c' that is the GND wiring. A source (S) of the PMOS transistor is electrically connected with the wiring M0g that is the VDD wiring.

<Plane Arrangement Example of Overall Cell Arrangement>

Figure 7:
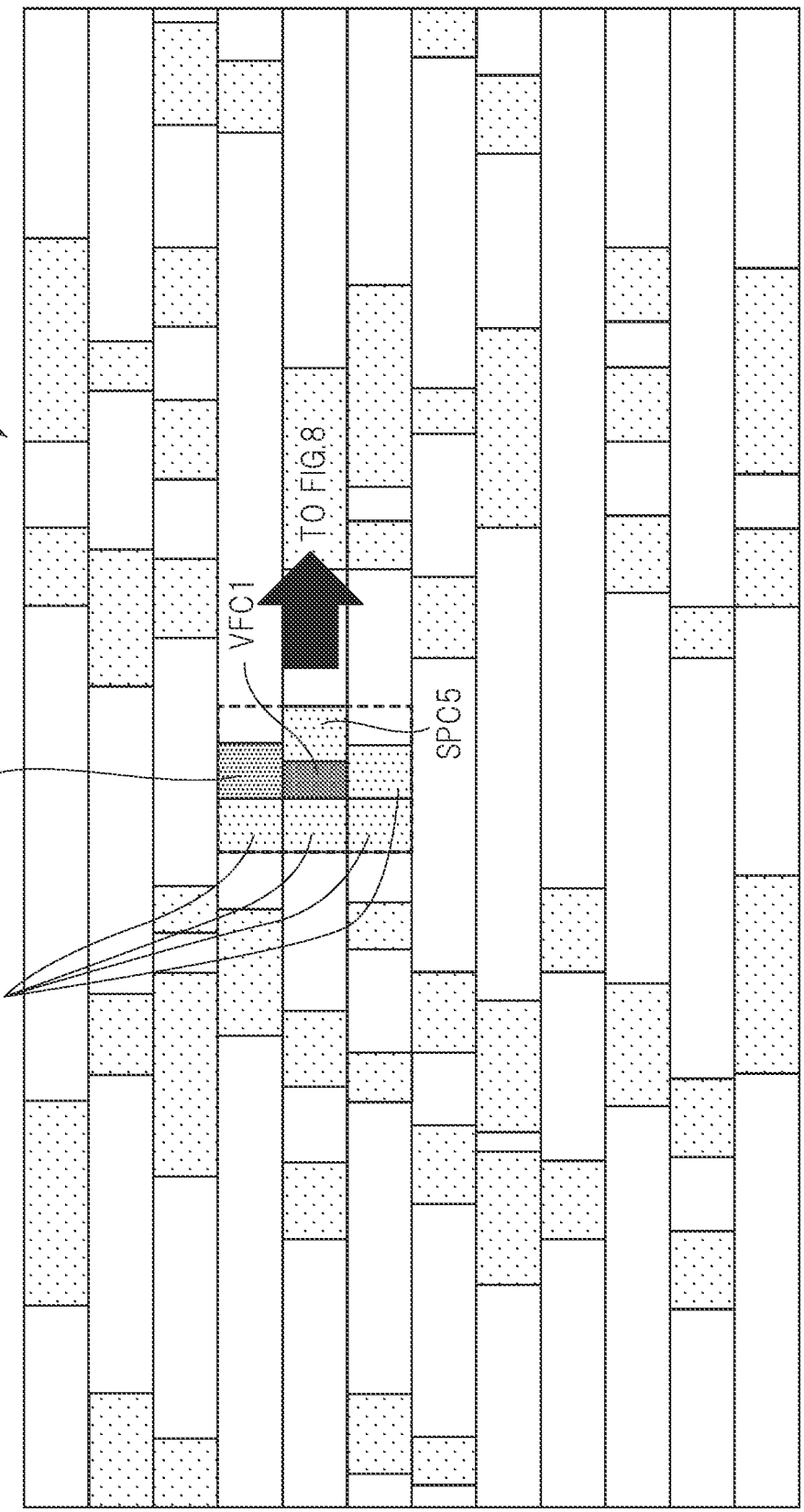
FIG. 7 is a plan view showing an example of overall cell arrangement according to the first embodiment.

FIG. 7 is a plan view showing an example of the overall cell arrangement according to the first embodiment. In other words, FIG. 7 is a drawing showing an example of the plan arrangement of various cells included in the semiconductor device 200a according to the first embodiment. Spare cells SPC1, SPC2, SPC3, SPC4 and SPC5 and the logical cell LC1 shown in FIGS. 3 and 4 surround the potential fix cell VFC1 shown in FIG. 1. The logical cell LC1 is a logical cell having a function of an inverter. The above-described spare cells can be various types of logical cells. However, the logical cells in the first embodiment are set to be logical cells each having the function of the inverter as similar to the logical cell LC1. Note that upper-layer wirings of the potential fix cell VFC1 and the cells around the potential fix cell VFC1 in FIG. 7 are shown to be enlarged in FIG. 8.

Figure 8:
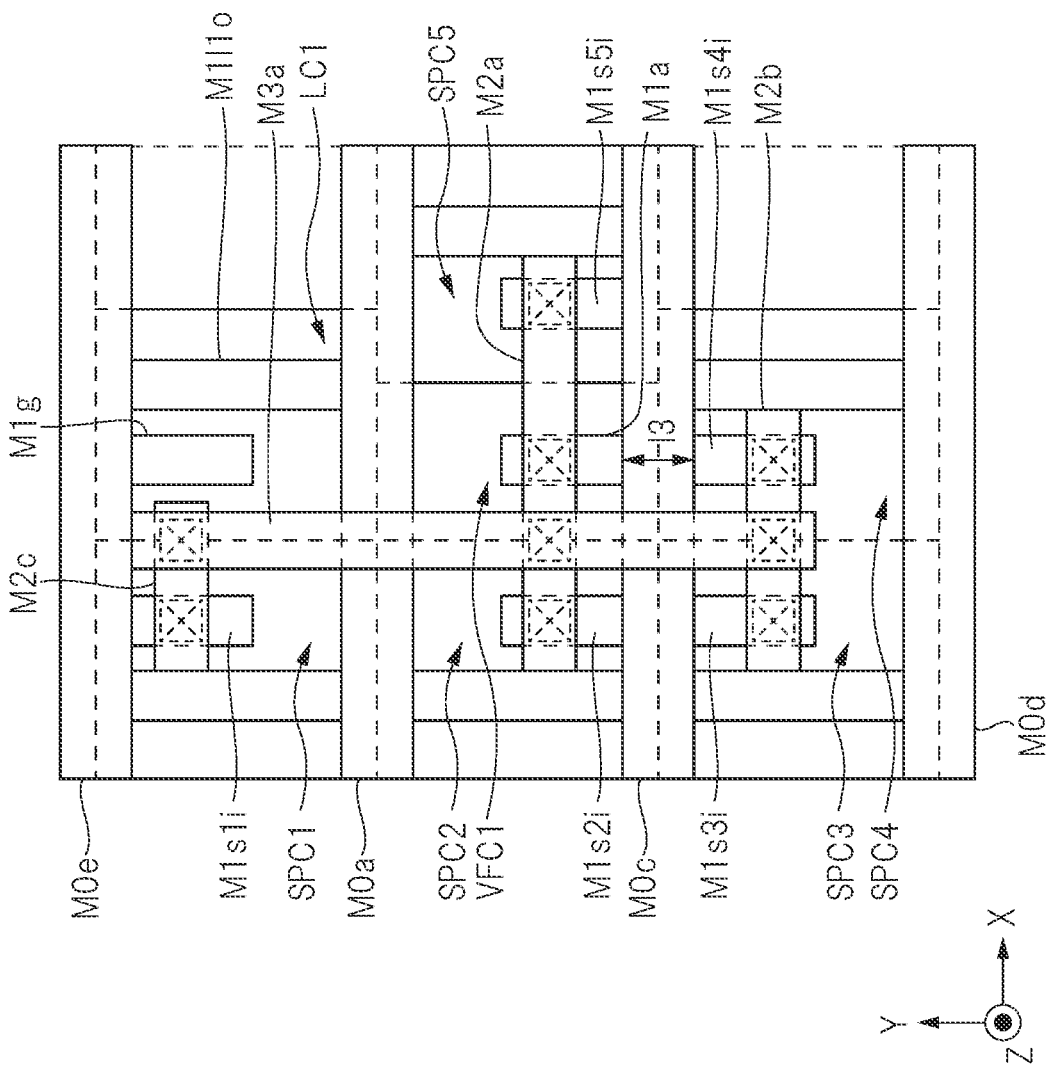
FIG. 8 is a plan view showing an example of a layout of a wiring used for fixing a potential of an input wiring of a spare cell according to the first embodiment.

FIG. 8 is a plan view showing an example of a layout of a wiring used for fixing the potential of the input wiring of the spare cell according to the first embodiment. Specifically, FIG. 8 is a drawing showing the wirings of the metal first layer to the metal third layer of each of the potential fix cell VFC1, the logical cell LC1, the spare cells SPC1, SPC2, SPC3, SPC4 and SPC5 in FIG. 7 and the power supply wiring of the metal zero-th layer.

The spare cell SPC1 includes an input wiring M1s1i, potential fix wirings M2c and M3a and power supply wirings M0a and Me. The input wiring M1s1i is wired in the metal first layer. The potential fix wiring M2c is wired in the metal second layer. The potential fix wiring M3a is wired in the metal third layer. The power supply wirings M0a and Me are wired in the metal zero-th layer. The input wiring M1s1i is electrically connected with the potential fix wiring M2c through the via. The potential fix wiring M2c is electrically connected with the potential fix wiring M3a through the via. The potential fix wiring M3a is a wiring electrically connected with the output wiring M1a of the potential fix cell VFC1.

The spare cell SPC2 includes an input wiring M1s2i, potential fix wirings M2a and M3a and power supply wirings M0a and M0c. The input wiring M1s2i is wired in the metal first layer. The potential fix wiring M2a is wired in the metal second layer. The potential fix wiring M3a is wired in the metal third layer. The power supply wirings M0a and M0c are wired in the metal zero-th layer. The input wiring M1s2i is electrically connected with the potential fix wiring M2a through the via. The potential fix wiring M2a is a wiring electrically connected with the potential fix wiring M3a through the via.

Regarding the spare cells SPC3 through SPC5, the potential fix cell VFC1 and the logical cell LC1, the overlapping explanation with other cells is omitted.

The spare cell SPC3 includes an input wiring M1s3i, potential fix wirings M2b and M3a and power supply wirings M0c and M0d. The input wiring M1s3i is wired in the metal first layer. The potential fix wiring M2b is wired in the metal second layer. The power supply wiring M0d is wired in the metal zero-th layer. The input wiring M1s3i is electrically connected with the potential fix wiring M2b through the via. The potential fix wiring M2b is electrically connected with the potential fix wiring M3a through the via.

The spare cell SPC4 includes an input wiring M1s4i, potential fix wirings M2b and M3a and power supply wirings M0c and M0d. The input wiring M1s4i is wired in the metal first layer. The input wiring M1s4i is electrically connected with the potential fix wiring M2b through the via. The potential fix wiring M2b is electrically connected with the potential fix wiring M3a through the via.

The spare cell SPC5 includes an input wiring M1s5i, a potential fix wiring M2a and power supply wirings M0a and M0c. The input wiring M1s5i is wired in the metal first layer. The input wiring M1s5i is electrically connected with the potential fix wiring M2a through the via.

The logical cell LC1 includes an output wiring M1a/1o, an input wiring M1g and power supply wirings M0a and M0e. The output wiring M1a/1o and the input wiring M1g are wired in the metal first layer.

The potential fix cell VFC1 includes an output wiring M1a, a potential fix wiring M2a and power supply wirings M0a and M0c. The output wiring M1a is electrically connected with the potential fix wiring M2a through the via. The output wiring M1a is electrically connected with the power supply wiring M0c supplying the power supply potential through the mutual connection wiring not shown.

As explained above, the input wiring of each of the spare cells SPC1, SPC2, SPC3, SPC4 and SPC5 is electrically connected with the output wiring M1a of the potential fix cell VFC1 through the potential fix wiring. Therefore, the input wiring of each of the spare cells SPC1, SPC2, SPC3, SPC4 and SPC5 is electrically connected with the power supply wiring supplying the power supply potential. The power supply wirings M0a, M0c, M0d and M0e are arranged at the cell boundary, and extend in the X-axis direction.

As shown in FIG. 8, a distance between the output wiring M1a of the potential fix cell VFC1 and the input wiring M1s4i of the spare cell SPC4 adjacent to the potential fix cell VFC1 is a distance 13. The distance 13 is a distance capable of suppressing the occurrence of the spacing error.

A modification state of a mask pattern in an event of metal modification that is the connection of the spare cell SPC1 with the logical cell LC1 in the layout of FIG. 8 will be explained with reference to FIGS. 9 and 10.

<Example of Mask Pattern Change in Event of Metal Modification>

Figure 9:
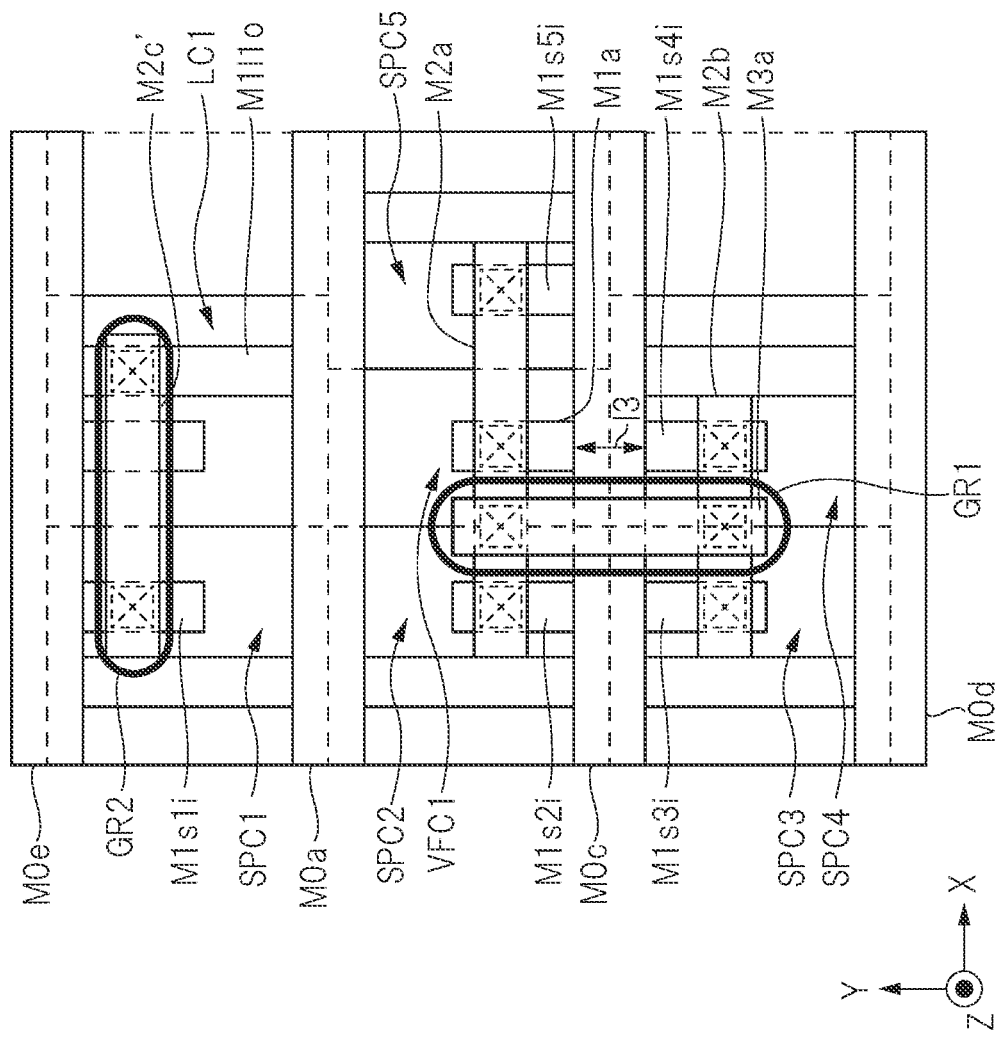
FIG. 9 is a plan view showing an example of layout change of a wiring using a spare cell in metal modification according to the first embodiment.

FIG. 9 is a plan view showing an example of layout change of the wiring using the spare cell in the event of the metal modification according to the first embodiment. Specifically, FIG. 9 is a drawing showing change of a wiring connecting the input wiring M1s1i of the spare cell SPC1 with the output wiring M1l1o of the logical cell LC1. In other words, a destination of the connection of the input wiring M1s1i of the spare cell SPC1 of FIG. 8 is changed from the output wiring M1a of the potential fix cell VFC1 to the output wiring M1l1o of the logical cell LC1.

Therefore, it is necessary to cut the electrical connection between the input wiring M1s1i of the spare cell SPC1 and the output wiring M1a of the potential fix cell VFC1. The wiring layer where the electrical connection is cut is preferably the metal layer in the upper layer where the change cost is lower. In the present embodiment, the electrical connection between the input wiring M1s1i of the spare cell SPC1 and the output wiring M1a of the potential fix cell VFC1 is electrically cut by avoiding a part of the wiring of the metal third layer from being used.

Specifically, the potential fix wiring M3a of the metal third layer in the region GR1 of FIG. 9 is left while the potential fix wiring M3a of the metal third layer in other regions is removed. In the region GR2, the input wiring M1s1i of the spare cell SPC1 is electrically connected with the output wiring M1l1o of the logical cell LC1 through the potential fix wiring M2c' of the metal second layer.

<Another Example of Mask Change in Event of Metal Modification>

Figure 10:
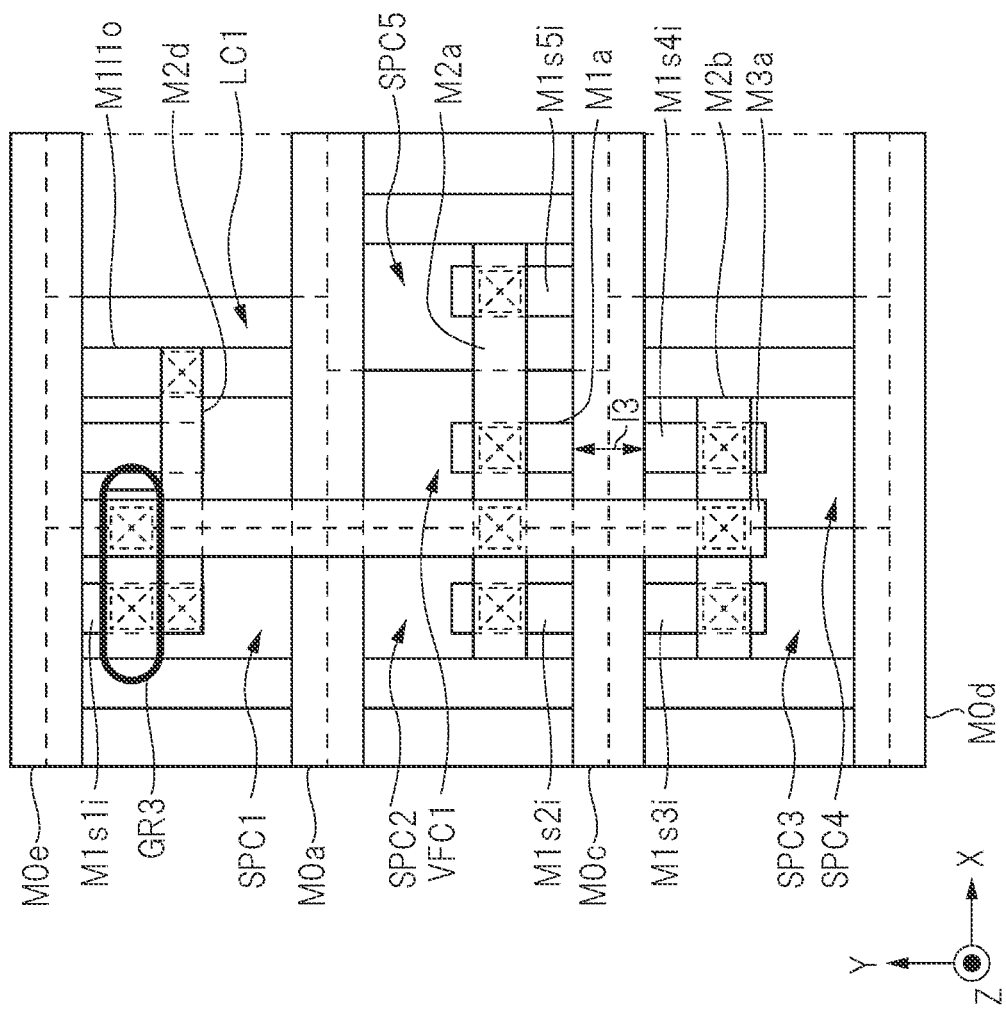
FIG. 10 is a plan view showing another example of the layout change of the wiring using the spare cell in metal modification according to the first embodiment.

FIG. 10 is a plan view showing another example of the layout change of the wiring using the spare cell in the event of the metal modification according to the first embodiment. Specifically, as similar to FIG. 9, FIG. 10 is a drawing showing the change of the destination of the connection of the input wiring M1s1i connected with the gate of the transistor of the spare cell SPC1 from the output wiring M1a of the potential fix cell VFC1 to the output wiring M1l1o of the logical cell LC1. FIG. 10 is different from FIG. 9 in that the potential fix wiring M3a of the metal third layer is not canceled, in that the potential fix wiring M2c of the metal second layer in the region GR3 is removed, and in that the input wiring M1s1i is electrically connected with the output wiring M1l1o through the potential fix wiring M2d of the metal second layer.

<Example of Design of Semiconductor Device>

Figure 11A:
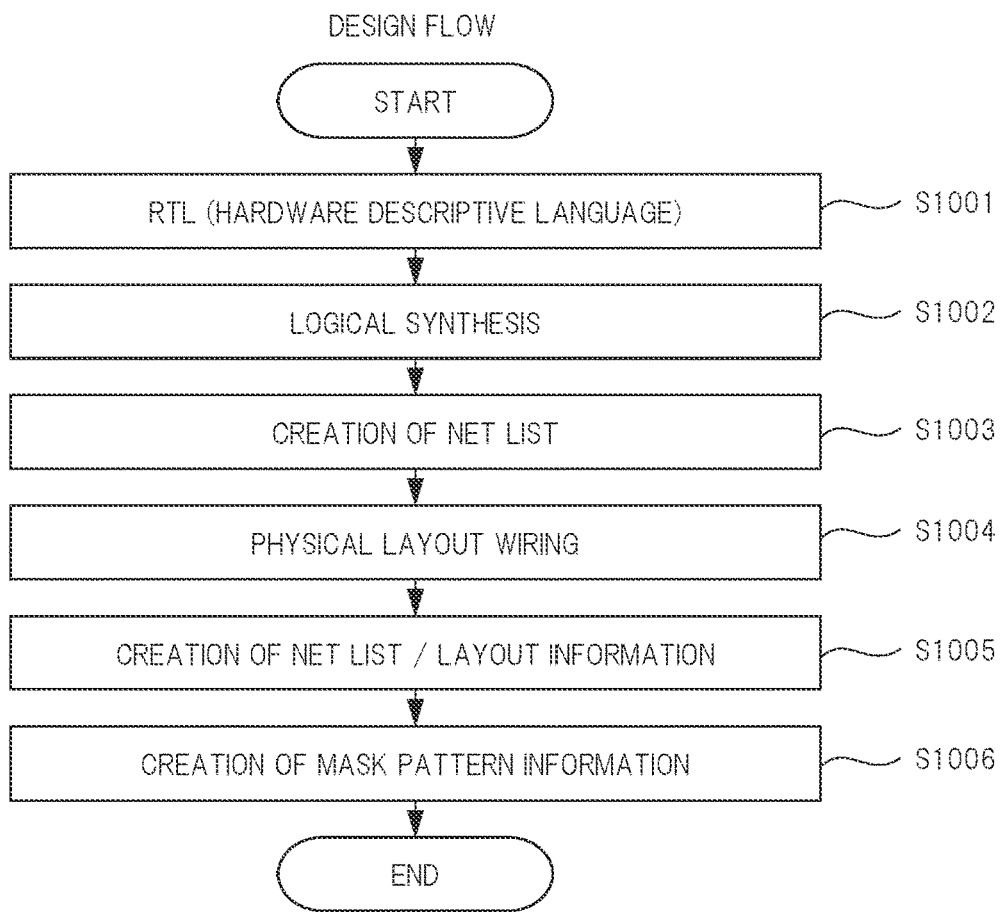
FIG. 11A is a flowchart showing an example of design of a semiconductor device according to the first embodiment.

FIG. 11A is a flowchart showing an example of design of the semiconductor device according to the first embodiment. Note that the flowchart of FIG. 11A is also applicable to designs of semiconductor devices according to second and third embodiments described later.

At a step S1001, RTL (Register Transfer Level) design is performed. The RTL is created on the basis of design specifications of the semiconductor device.

The RTL is described using a hardware descriptive language.

At a step S1002, logical synthesis is performed using a source file of the RTL described with the hardware descriptive language.

At a step S1003, a logic gate and a netlist of the transistor are created using a result of the logical synthesis and a cell library.

At a step S1004, physical layout wiring is performed by input of the netlist to a physical layout wiring tool. At this stage, layout wiring of the potential fix cell is also performed. In other words, the output wiring of the potential fix cell is formed in the metal first layer or upper from the GND wiring of the metal zero-th layer through the mutual connection wiring in the lower layer than the metal zero-th layer.

At a step S1005, the netlist/layout wiring is created on the basis of a process result of the physical layout wiring.

At a step S1006, mask pattern information is created using the netlist/layout information.

<Example of Process Procedure in Event of Metal Modification of Semiconductor Device>

Figure 11B:
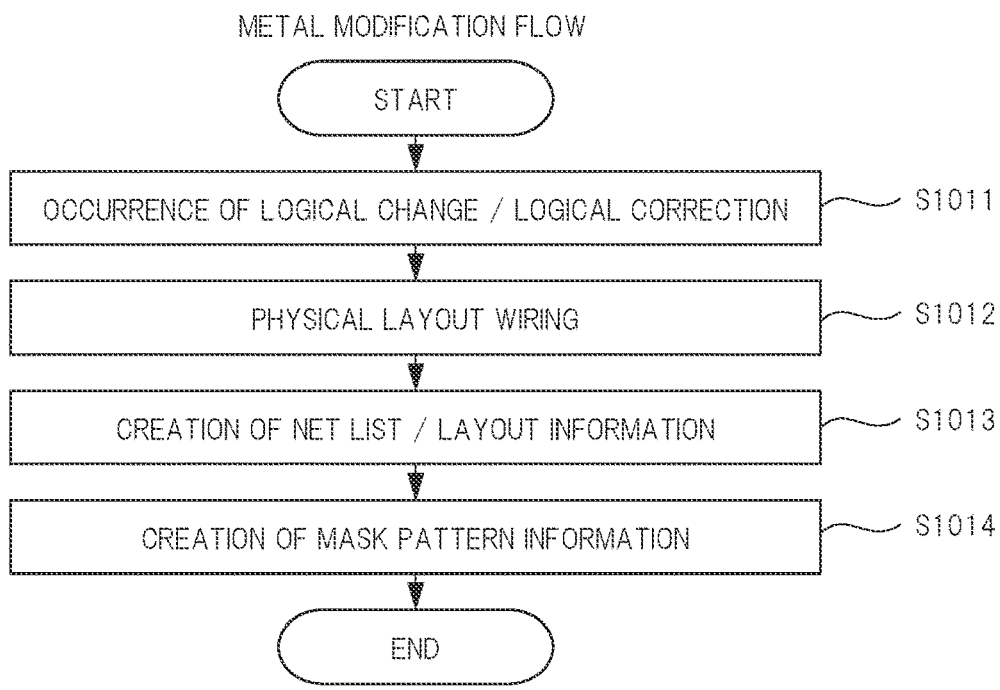
FIG. 11B is a flowchart showing an example of a process procedure in metal modification of a semiconductor device according to the first embodiment.

FIG. 11B is a flowchart showing an example of a process procedure in the event of the metal modification of the semiconductor device according to the first embodiment. Note that the flowchart of FIG. 11B is also applicable to a process procedure in the event of the metal modification of the semiconductor devices according to the second and third embodiments described later.

At a step S1011, logical change/logical correction occurs. In this case, a circuit change point is extracted, and a necessary functional cell is extracted.

At a step S1012, connection/rewiring among the cells is performed using the physical layout wiring tool.

At a step S1013, the netlist/layout information is created on the basis of a process result of the connection/rewiring among the cells.

At a step S1014, the mask pattern information is created using the netlist/layout information.

As described above, according to the first embodiment, the output wiring of the potential fix cell outputting the reference potential for fixing the potential of the input wiring of the spare cell to prevent the through current from flowing in the spare cell is formed at the position distant from the cell boundary, that is the position shifting into the potential fix cell. In this manner, the output wiring of the potential fix cell according to the first embodiment can be more sufficiently spaced from the wiring of another cell adjacent to the potential fix cell than the case of the formation of the output wiring in the direction immediately above the power supply wiring positioned at the cell boundary, and therefore, a distance that is equal to or larger than the minimum distance between the wirings defined by the design rule can be maintained. In other words, in the output wiring of the potential fix cell according to the first embodiment, the cost resulted from the mask change for the wiring pattern in the metal modification can be suppressed, and the occurrence of the spacing error can be suppressed before and after the metal modification.

Second Embodiment

<Configuration in Case of Addition of Function of Potential Fix Cell to Tap Cell of Semiconductor Device>

An area of the semiconductor device is increased by the potential fix cell according to the first embodiment. Meanwhile, a tap cell is arranged inside the semiconductor device to function as a cell for outputting the power supply potential to the well (semiconductor layer) where the logical cell is arranged. Therefore, the increase in the area of the semiconductor device can be suppressed by addition of the function of the potential fix cell to the tap cell according to the first embodiment, that is the addition of the function of the tap cell to the potential fix cell according to the first embodiment. Accordingly, in a second embodiment, a semiconductor device with the addition of the function of the potential fix cell to the tap cell, that is a semiconductor device with the addition of the function of the tap cell to the potential fix cell for suppressing the increase in the area of the semiconductor device will be explained. A tap cell with the potential fix function VFTAP1 as an example of the addition of the function of the potential fix cell to the tap cell will be explained below.

Figure 12:
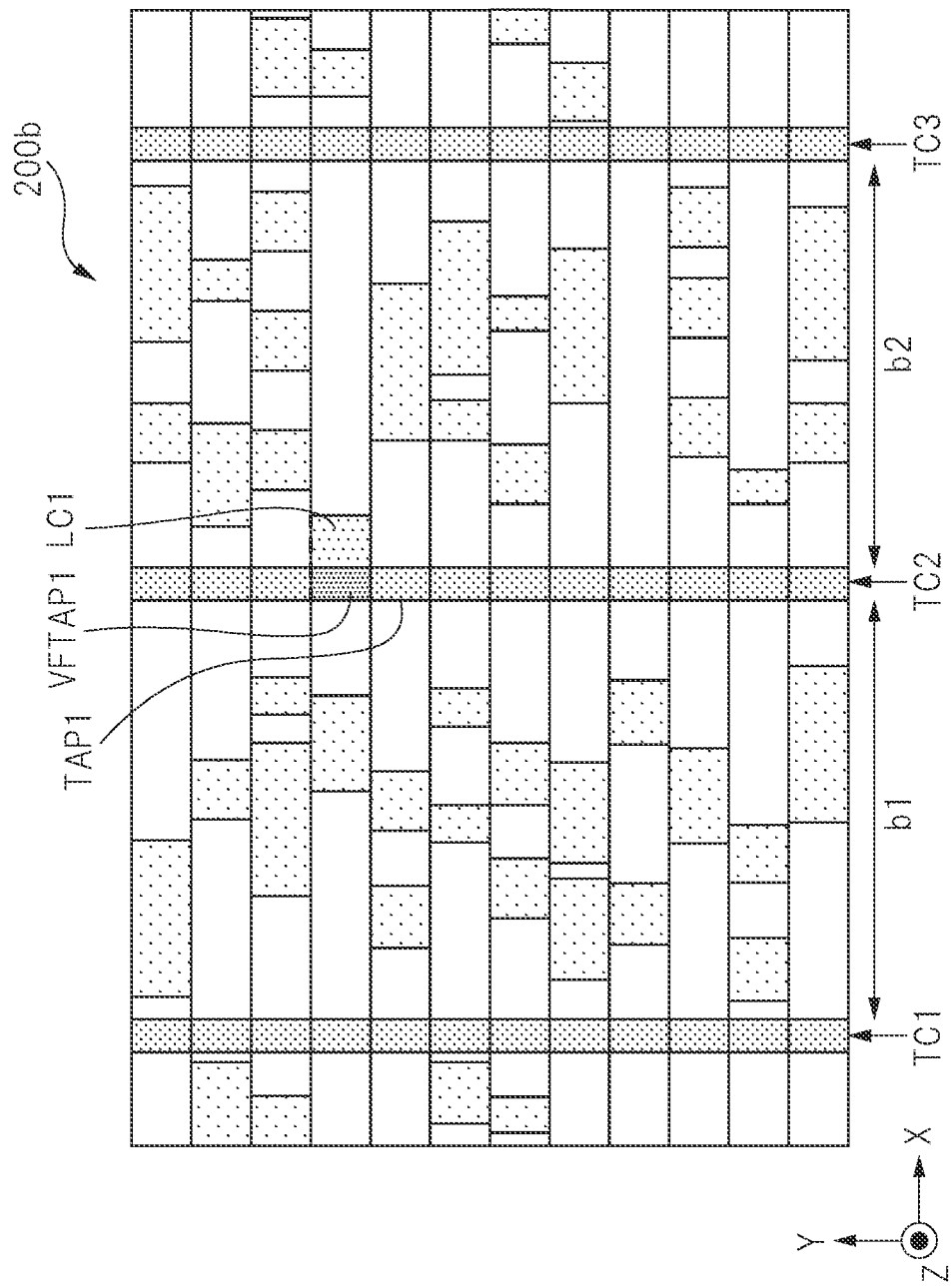
FIG. 12 is a plan view showing an example of overall cell arrangement according to a second embodiment.

FIG. 12 is a plan view showing an example of the overall cell arrangement according to the second embodiment. Specifically, FIG. 12 is a plan view showing an example of a formation position of the tap cell with the potential fix function VFTAP1 in a semiconductor device 200b. In FIG. 12, the tap cells are arranged to be adjacent to each other in the Y-axis direction, and the adjacent tap cells are aligned at a certain interval in the X-axis direction. By this arrangement of the tap cells, variation in the supplied potential to the logical cell can be reduced.

Note that the arrangement of the tap cells is not limited to the arrangement of FIG. 12, and one or more tap cells can be arranged to disperse in an island form. Regarding an arrangement density of the tap cells, the high arrangement density can be set around the logical cell consuming the relatively large power. In other words, the tap cells are arranged at a preset constant or variable density.

The spare cells each having the potential to be fixed are also arranged at a preset constant or variable density. Therefore, the arrangement density of the tap cell and the arrangement density of the spare cell may be probably equal or close to each other. In such a case, when this tap cell is replaced with the tap cell with the potential fix function VFTAP1, the tap cell with the potential fix function VFTAP1 is efficiently arranged. Also, as described above, by the tap cell with the potential fix function VFTAP1, the increase in the area of the semiconductor device 200b can be suppressed.

In FIG. 12, note that a tap cell column distance "b1" indicates a distance between a tap cell column TC1 and a tap cell column TC2 in the X-axis direction. A tap cell column distance "b2" indicates a distance between the tap cell column TC2 and a tap cell column TC23 in the X-axis direction.

Each of FIGS. 13A and 13B is a plan view showing an example of a layout of the tap cell with the potential fix function according to the second embodiment. FIG. 13A shows a layout of an upper layer region of the tap cell with the potential fix function, and FIG. 13B shows a layout of a lower layer region of the tap cell with the potential fix function. Therefore, on the X-Y plane, a dashed dotted line F-F of FIG. 13A and a dashed dotted line E-E of FIG. 13B overlap each other. A length of the tap cell with the potential fix function VFTAP1 in the X-axis direction is "1g", and a length of the same in the Y-axis direction is "1f".

The tap cell with the potential fix function VFTAP1 (UPPER) of FIG. 13A includes a first wiring M0i, a second wiring M0j, a third wiring M0h, an output wiring M1c and a via V0d. The first wiring M0i, the second wiring M0j and the third wiring M0h are formed in the metal zero-th layer. The output wiring M1c is formed in the metal first layer that is the upper layer of the metal zero-th layer. The via V0d is formed between the metal zero-th layer and the metal first layer. The via V0d electrically connects the first wiring M0i and the output wiring M1c. The second wiring M0j is a GND wiring having a GND potential. The third wiring M0h is a VDD wiring having a VDD potential.

The tap cell with the potential fix function VFTAP1 (LOWER) of FIG. 13B includes an NWELL (N-type well, N-type semiconductor layer) and a PWELL (P-type well, P-type semiconductor layer). An N-type diffusion region ODc, a mutual connection wiring MDd and a via VDe are included in a region of the NEWLL. The N-type diffusion region ODc is formed in a surface layer of the NEWLL when being doped with an N-type impurity. Note that an N-type impurity concentration of the N-type diffusion region ODc is set to be larger than an N-type impurity concentration of the NWELL. A part of the mutual connection wiring MDd in the mutual connection layer is formed on the N-type diffusion region ODc, and the mutual connection wiring MDd is electrically connected with the NWELL through the N-type diffusion region ODc. The via VDe is positioned between the mutual connection layer and the metal zero-th layer. The via VDe electrically connects the mutual connection wiring MDd and the third wiring M0h of FIG. 13A.

A P-type diffusion region ODd, a mutual connection wiring MDe, a via VDf and and a via VDg are included in the PWELL. The P-type diffusion region ODd is formed in a surface layer of the PWELL when being doped with a P-type impurity. Note that a P-type impurity concentration of the P-type diffusion region ODd is set to be larger than a P-type impurity concentration of the PWELL. A part of the mutual connection wiring MDe in the mutual connection layer is formed on the P-type diffusion region Odd, and the mutual connection wiring MDe is electrically connected with the PWELL through the P-type diffusion region ODd. The via VDg and the via VDf are positioned between the mutual connection layer and the metal zero-th layer. The via VDg electrically connects the mutual connection wiring MDe and the second wiring M0j of FIG. 13A. The via VDf electrically connects the mutual connection wiring MDe and the first wiring M0i of FIG. 13A.

FIG. 14 is a cross-sectional view showing an example of a layout of the tap cell with the potential fix function according to the second embodiment. FIG. 14 shows cross sections on the dashed dotted line F-F of FIG. 13A and the dashed dotted line E-E of FIG. 13B. Therefore, FIG. 14 includes the cross section F-F of FIG. 13A on its upper side, and includes the cross section E-E of FIG. 13B on its lower side.

The function of the potential fix cell and the function of the tap cell are included in a region R1 of FIG. 14. The P-type diffusion region ODd, the mutual connection wiring MDe, the first wiring M0i, the second wiring M0j, the output wiring M1c, the via VDf, the via VDg and the via V0d are included in the region R1. The mutual connection wiring MDe is electrically connected with the P-type diffusion region ODd. The first wiring M0i and the second wiring M0j are formed in the metal zero-th layer that is the upper layer of the mutual connection layer. The output wiring M1c is formed in the metal first layer that is the upper layer of the metal zero-th layer. The via V0d is formed between the metal zero-th layer and the metal first layer.

The via VDg electrically connects the second wiring M0j and the mutual connection layer MDe. The second wiring M0j is a GND wiring. The P-type diffusion region ODd is electrically connected with the PWELL. Therefore, the GND potential is supplied from the second wiring M0j to the PWELL through the P-type diffusion region ODd and the mutual connection layer MDe. In other words, in the region R1 of FIG. 14, the function serving as the tap cell, that is, the function of supplying the power supply potential to the PWELL is achieved. The via VDf electrically connects the first wiring M0i and the mutual connection layer MDe. The via V0d electrically connects the first wiring M0i and the output wiring M1c. Therefore, the output wiring M1c is electrically connected with the second wiring M0j that is the GND wiring through the first wiring M0i and the mutual connection layer MDe. In other words, in the region R1 of FIG. 14, the function serving as the potential fix cell is achieved.

In other regions than the region R1 of FIG. 14, only the function serving as the tap cell, that is, the function of supplying the power supply potential to the NWELL is achieved. Specifically, the third wiring M0h is connected with the NWELL through the via VDe, the mutual connection layer MDd and the N-type diffusion region ODc. Therefore, the VDD potential is supplied from the third wiring M0h to the NWELL.

Note that the output wiring M1c of the metal first layer of the region R1 is a wiring to be connected with the input wiring of the spare cell not illustrated in the upper layer of the output wiring M1c. As shown in FIG. 14, a distance between the output wiring M1c of the metal first layer and a wiring of the metal first layer of an adjacent cell is defined by a distance 14. As similar to the potential fix cell according to the first embodiment, the tap cell with the potential fix function according to the second embodiment can secure the distance 14 capable of suppressing the occurrence of the spacing error.

As described above, the tap cell with the potential fix function according to the second embodiment can provide the same effect as that of the first embodiment since the region R1 of the tap cell is the region for achieving the function of fixing the potential. The function of fixing the potential can be achieved inside the region of the tap cell. Therefore, in the semiconductor device according to the second embodiment, the space can be reduced more than that of the semiconductor device according to the first embodiment as well.

In the above-described second embodiment, note that the configuration in which the function of the potential fix cell is added to the portion of supplying the GND potential to the PWELL has been explained. However, the function of the potential fix cell may be added to the portion of supplying the VDD potential to the NWELL. In this case, the via VDf is connected with not the mutual connection wiring MDe but the mutual connection wiring MDd. By such a configuration, the third wiring M0h is connected with not only the NWELL but also the output wiring M1c through the mutual connection wiring MDd. As a result, the output wiring M1c outputs the reference potential corresponding to the VDD potential.

In the above-described second embodiment, the tap cell with the potential fix function VFTAP1 with the addition of the function of the potential fix cell of the first embodiment to the tap cell has been explained. However, the function of the tap cell may be added to the potential fix cell of the first embodiment. In this case, for example, the number of tap cells to be originally arranged inside the semiconductor device can be reduced. If the number of tap cells to be originally arranged inside the semiconductor device is not reduced, the well potential of the logical cell can be stabilized by arrangement of the potential fix cell with the tap cell function.

Third Embodiment

<Configuration in Case of Addition of Function of Fixing Potential to Logical Cell of Semiconductor Device>

A logical cell according to a third embodiment is a logical cell with a potential fix function with addition of the function of fixing the potential to the logical cell. An area of a semiconductor device according to the third embodiment including the logical cell with the addition of the function of fixing the potential can be made smaller than the area of the semiconductor device according to the first embodiment, that is the area in a case in which the potential fix cell is arranged inside the semiconductor device to separate from the logical cell.

Each of FIGS. 15A and 15B is a plan view showing an example of a layout of the logical cell with the potential fix function according to the third embodiment. FIG. 15A shows a layout of an upper layer region of the logical cell with the potential fix function, and FIG. 15B shows a layout of a lower layer region of the logical cell with the potential fix function. Therefore, on the X-Y plane, a dashed dotted line H-H of FIG. 15A and a dashed dotted line I-I of FIG. 15B overlap each other. A length of the logical cell with the potential fix function VFLC1 in the X-axis direction is "1f", and a length of the same in the Y-axis direction is "1i".

As shown in FIG. 15B, the logical cell with the potential fix function VFLC1 is a logical cell including parallel-connected 6 inverters. Gate electrodes g4 through g9 indicate 6 gate electrodes, respectively. Note that a region R4 of the logical cell with the potential fix function VFLC1 (LOWER) of FIG. 15B is included inside a region of an N-type well not illustrated, and is a region where 6 PMOS transistors are formed. A region R5 of the logical cell with the potential fix function VFLC1 of FIG. 15B is included inside a region of a P-type well not illustrated, and is a region where 6 NMOS transistors are formed. The function of fixing the potential is achieved by the region R2 of the logical cell with the potential fix function VFLC1(UPPER) of FIG. 15A and the region R3 of the logical cell with the potential fix function VFLC1 of FIG. 15B. Note that the inverter made of the PMOS transistor and the NMOS transistor shown in FIG. 15 is the same as the inverter shown in FIG. 3 except that the number of the parallel-connected inverters is different, and therefore, the detailed explanation will be omitted.

A first wiring M0o, a second wiring M0q, an output wiring M1d and a via V0e are included in the region R2 of FIG. 15A. The first wiring M0o and the second wiring M0q are formed in the metal zero-th layer. The output wiring M1d is formed in the metal first layer that is the upper layer of the metal zero-th layer. The via V0e is formed between the metal zero-th layer and the metal first layer. The via V0e electrically connects the first wiring M0o and the output wiring M1d. Note that the metal first layer is at a position closer to the +Z-axis direction than the metal zero-th layer in FIG. 15A. The second wiring M0q is a GND wiring having a GND potential. The third wiring M0k is a VDD wiring having a VDD potential.

An N-type diffusion region ODf, a mutual connection wiring MDg, a via VDi and a via VDj are included in the region R3 of FIG. 15B. The mutual connection wiring MDg is formed in the mutual connection layer. The mutual connection wiring MDg is electrically connected with the N-type diffusion region ODf. The mutual connection wiring MDg is electrically connected with the via VDi and the via VDj extending in the +Z-axis direction from the mutual connection wiring MDg.

Figure 16:
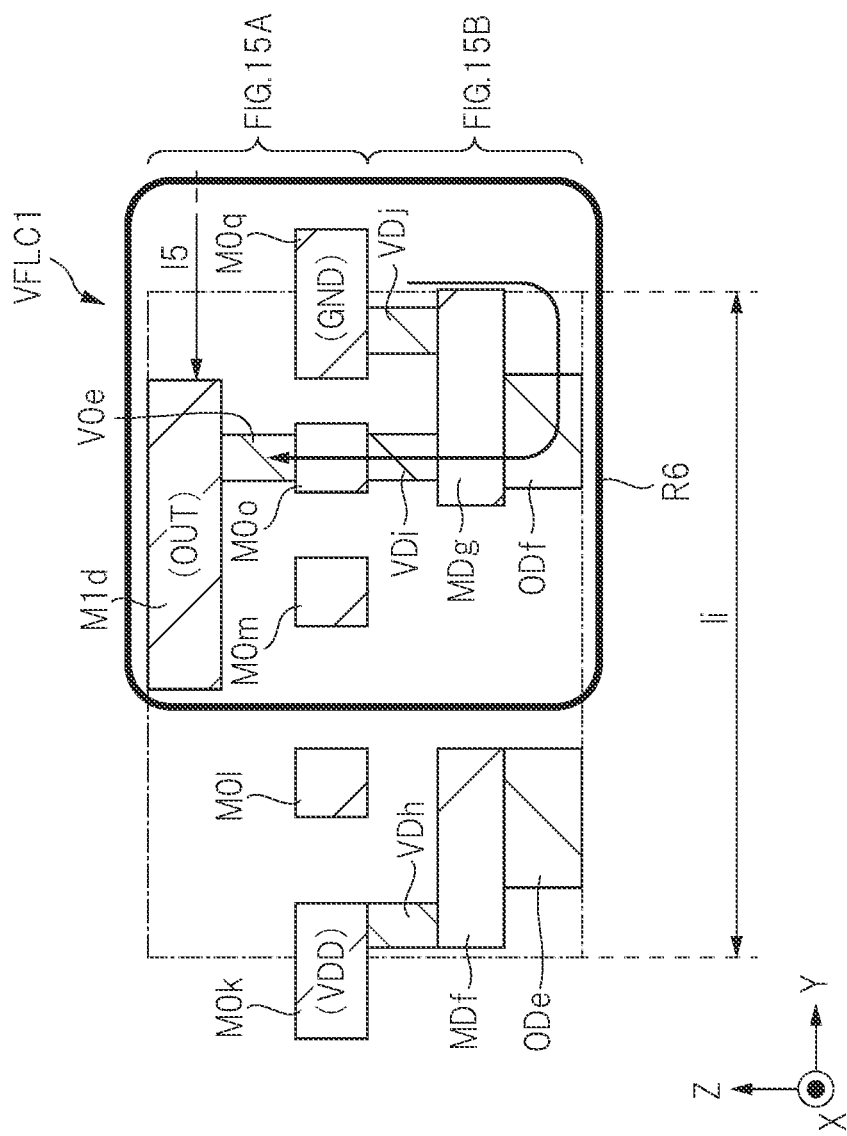
FIG. 16 is a cross-sectional view showing an example of the layout of the logical cell with the potential fix function according to the third embodiment.

FIG. 16 is a cross-sectional view showing an example of a layout of the logical cell with the potential fix function according to the third embodiment. FIG. 16 shows a cross-sectional view on a dashed dotted line H-H of FIG. 15A and a dashed dotted line I-I of FIG. 15B. Therefore, FIG. 16 includes a cross section H-H of FIG. 15A on its upper side and a cross section I-I of FIG. 15B on its lower side. In a region R6 of FIG. 16, a function of outputting a reference potential to a spare cell not illustrated is achieved.

The output wiring M1$d$, the first wiring M0$o$, the second wiring M0$q$, the mutual connection wiring MDg, the N-type diffusion region ODf, and the via V0$e$, VDi and VDj are included in the region R6. The output wiring M1$d$ is connected with the second wiring M0$q$ through the via V0$e$, the first wiring M0$o$, the via VDi, the mutual connection wiring MDg and the via VDj, and receives the GND potential from the second wiring M0$q$. As a result, the output wiring M1$d$ can output the reference potential corresponding to the GND potential. The GND potential is supplied from the second wiring M0$q$ to the N-type diffusion region ODf through the via VDj and the mutual connection wiring MDg. The N-type diffusion region ODf functions as the source (S) of the NMOS transistor.

As shown in FIG. 16, a distance between the output wiring M1$d$ of the metal first layer and a wiring of the metal first layer of an adjacent cell in the Y-axis direction is indicated by a distance 15. As similar to the potential fix cell according to the first embodiment, the logical cell with the potential fix function according to the third embodiment can secure the distance 15 capable of suppressing the occurrence of the spacing error.

Figure 17:
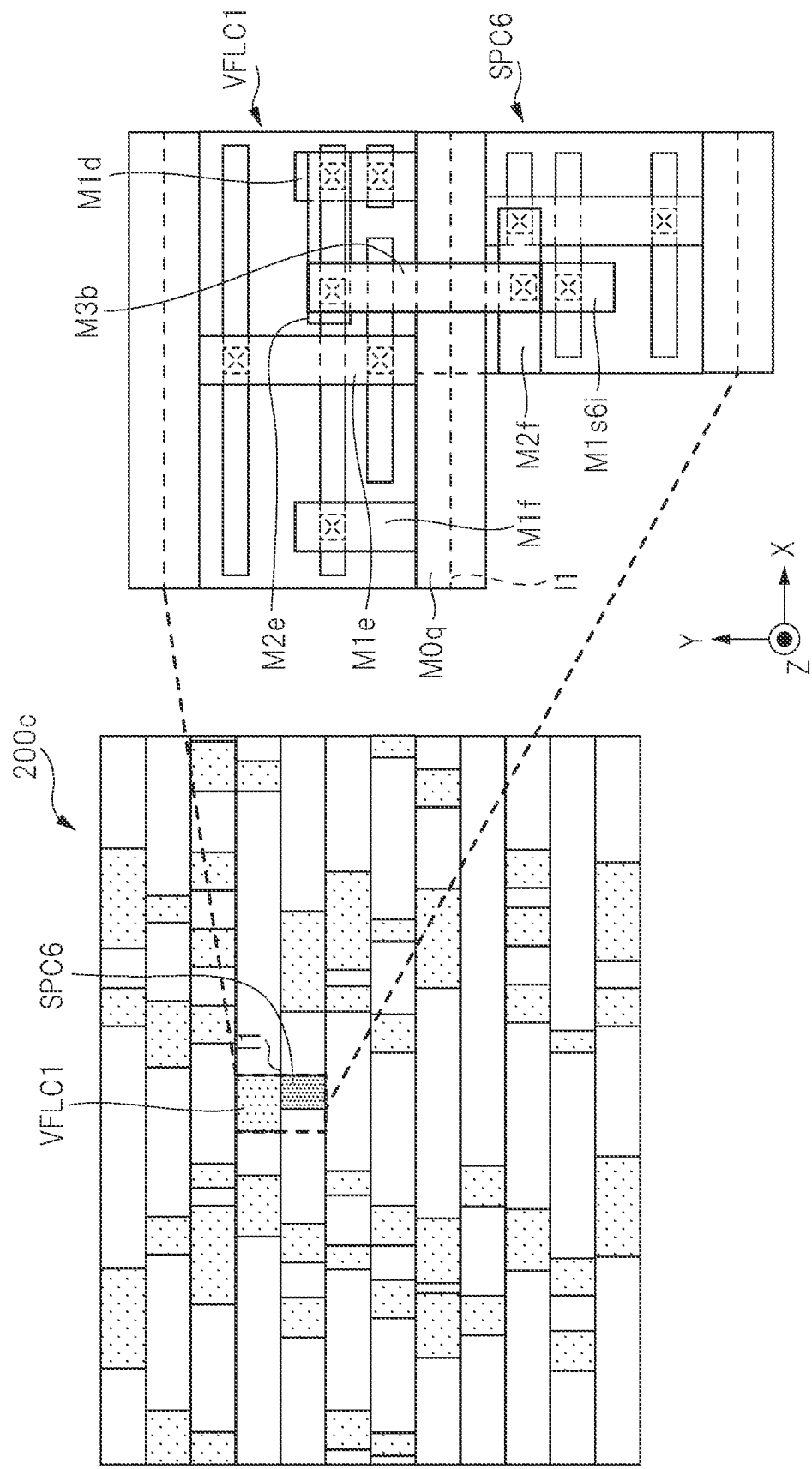
FIG. 17 is a plan view showing an example of overall cell arrangement and wiring according to the third embodiment.

FIG. 17 is a plan view showing an example of overall cell arrangement and wiring according to the third embodiment. In other words, FIG. 17 is a plan view showing an example of a layout of the spare cell and the logical cell with the potential fix function VFLC1 included in the semiconductor device 200 according to the third embodiment. An input wiring M1$s$6$i$ of an SPC6 that is the spare cell is formed in the metal first layer. The input wiring M1$s$6$i$ formed in the metal first layer is electrically connected with the output wiring M1$d$ of the logical cell with the potential fix function VFLC1 through the wiring M2$f$ of the metal second layer, the wiring M3$b$ of the metal third layer and the wiring M2$e$ of the metal second layer. The output wiring M1$d$ of the logical cell with the potential fix function VFLC1 is electrically connected with the second wiring M0$q$ that is also the GND wiring. Therefore, the input wiring M1$s$6$i$ of the spare cell is electrically connected with the GND wiring.

As described above, the logical cell with the potential fix function according to the third embodiment can provide the same effect as that of the first embodiment since the region R6 of the logical cell is the region for achieving the function of fixing the potential. The function of fixing the potential can be achieved inside the region of the logical cell. Therefore, in the semiconductor device according to the third embodiment, the space can be reduced more than that of the semiconductor device according to the first embodiment as well.

In the above-described third embodiment, note that the configuration with the addition of the function of the potential fix cell to the region where the N-type diffusion region ODf functioning as the source (S) of the NMOS transistor is formed has been explained. However, the function of the potential fix cell may be added to the region where the P-type diffusion region ODe functioning as the source (S) of the PMOS transistor is formed. In this case, the via VDi is connected with not the mutual connection wiring MDg but the mutual connection wiring MDf. By such a configuration, the third wiring M0$k$ is connected with not only the P-type diffusion region ODe but also the output wiring M1$d$ through the mutual connection wiring MDf. As a result, the output wiring M1$c$ outputs the reference potential corresponding to the VDD potential.

Also, in the above-described third embodiment, the logical cell with the potential fix function VFLC1 with the addition of the function of the potential fix cell according to the first embodiment to the logical cell has been explained. However, the function of the logical cell may be added to the potential fix cell according to the first embodiment. Even in this case, the area of the semiconductor device can be made smaller than that of the semiconductor device according to the first embodiment.

In the foregoing, the invention made by the present inventors has been concretely described on the basis of the embodiments. However, it is needless to say that the present invention is not limited to the foregoing embodiments and various modifications can be made within the scope of the present invention.

What is claimed is:

1. A semiconductor device comprising:
   a logical cell;
   a spare cell configuring a new logical function in combination with the logical cell in event of design change; and
   a potential fix cell outputting a reference potential used for fixing a potential of an input wiring of the spare cell,
   wherein the potential fix cell includes:
      a mutual connection wiring;
      a first wiring formed in an upper layer of the mutual connection wiring and connected with the mutual connection wiring;
      a second wiring formed in an upper layer of the mutual connection wiring and connected with the mutual connection wiring; and
      an output wiring formed in an upper layer of the first wiring and connected with the first wiring,
   wherein the second wiring has a power supply potential, and is wired at a cell boundary between the potential fix cell and an adjacent different cell, in a lower layer of the output wiring,
   wherein the first wiring is wired to be closer to inside of the potential fix cell than the second wiring, and
   wherein the output wiring outputs the reference potential in response to reception of the power supply potential through the second wiring, the mutual connection wiring and the first wiring.

2. The semiconductor device according to claim 1,
   wherein the second wiring is a power supply wiring of the semiconductor device.

3. The semiconductor device according to claim 1 further comprising:
   a tap cell supplying a power supply potential from a power supply wiring of the semiconductor device to a well of the semiconductor device, wherein the tap cell includes:
  the mutual connection wiring;
  the first wiring;
  the output wiring;
  a power supply wiring of the tap cell used as the second wiring; and
  the well connected with the power supply wiring through the mutual connection wiring,
wherein the power supply wiring has the power supply potential, and is wired at a cell boundary between the tap cell and an adjacent different cell, in a lower layer of the output wiring,
wherein the first wiring is wired to be closer to inside of the tap cell than the power supply wiring, and
wherein the output wiring outputs the reference potential in response to reception of the power supply potential through the power supply wiring, the mutual connection wiring and the first wiring, and achieves a function of the potential fix cell in place of the potential fix cell.

4. The semiconductor device according to claim 1,
wherein the logical cell includes:
  the mutual connection wiring;
  the first wiring;
  the output wiring;
  a power supply wiring of the logical cell used as the second wiring; and
  a diffusion layer connected with the power supply wiring through the mutual connection wiring,
wherein the power supply wiring has the power supply potential, and is wired at a cell boundary between the logical cell and an adjacent different cell, in a lower layer of the output wiring,
wherein the first wiring is wired to be closer to inside of the logical cell than the power supply wiring, and
wherein the output wiring outputs the reference potential in response to reception of the power supply potential through the power supply wiring, the mutual connection wiring and the first wiring, and achieves a function of the potential fix cell in place of the potential fix cell.

5. The semiconductor device according to claim 1 further comprising:
  the input wiring of the spare cell; and
  a connection wiring connected with the output wiring of the potential fix cell,
wherein the connection wiring is wired in a wiring layer that is an upper layer than a wiring layer where the input wiring of the spare cell and the output wiring of the potential fix cell are wired.

6. A semiconductor device comprising:
  a logical cell including a first transistor;
  a spare cell including a second transistor connectable with the first transistor in event of design change; and
  a potential fix cell being adjacent to the logical cell in a first direction and supplying a reference potential to an input of the second transistor;
  a first power supply wiring extending in a second direction different from the first direction at a first cell boundary of the logical cell, and supplying a first power supply potential to the first transistor; and
  a second power supply wiring extending in the second direction at a second cell boundary of the logical cell, and supplying a second power supply potential to the first transistor,
wherein the first cell boundary is a cell boundary between the logical cell and the potential fix cell,
wherein the potential fix cell includes:
  a mutual connection wiring extending in the first direction;
  a first wiring formed in an upper layer of the mutual connection wiring and connected with the mutual connection wiring; and
  an output wiring formed in an upper layer of the first wiring and connected with the first wiring,
wherein the first power supply wiring is formed in an upper layer of the mutual connection wiring and arranged between the logical cell and the first wiring in the first direction, and
wherein the output wiring outputs the reference potential in response to reception of the first power supply potential from the first power supply wiring through the mutual connection wiring and the first wiring.

7. The semiconductor device according to claim 6,
wherein the potential fix cell further includes:
  a first semiconductor layer having a first conductivity type; and
  a first diffusion layer having the first conductivity type formed in a surface layer of the first semiconductor layer, and connected with the mutual connection wiring,
wherein the first power supply potential is supplied from the first power supply wiring to the first semiconductor layer through the mutual connection wiring and the first diffusion layer.

8. The semiconductor device according to claim 7,
wherein the semiconductor device further includes:
  a third power supply wiring extending in the second direction at a third cell boundary of the potential fix cell, and supplying the second power supply potential,
wherein the potential fix cell further includes:
  a second semiconductor layer having a second conductivity type different from the first conductivity type, and being adjacent to the first semiconductor layer in the first direction; and
  a second diffusion layer having the second conductivity type formed in a surface layer of the second semiconductor layer, and connected with the third power supply wiring,
wherein the second power supply potential is supplied from the third power supply wiring to the second semiconductor layer through the second diffusion layer.

9. The semiconductor device according to claim 6,
wherein the potential fix cell further includes:
  a third semiconductor layer having a first conductivity type;
  a gate electrode formed in an upper layer of the third semiconductor layer, and extending in the first direction;
  a third diffusion layer having the first conductivity type formed in a surface layer of the third semiconductor layer, and connected with the mutual connection wiring; and
  a fourth diffusion layer formed in a surface layer of the third semiconductor layer,
the third diffusion layer and the fourth diffusion layer are arranged to sandwich a region of the third semiconductor layer covered with the gate electrode, and
wherein the first power supply potential is supplied from the first power supply wiring to the third diffusion layer through the mutual connection wiring.

10. The semiconductor device according to claim 9,
wherein the semiconductor device further includes:
- a third power supply wiring extending in the second direction at a third cell boundary of the potential fix cell, and supplying the second power supply potential, wherein the potential fix cell further includes:
- a fourth semiconductor layer having a second conductivity type different from the first conductivity type, and being adjacent to the third semiconductor layer in the first direction;
- a fifth diffusion layer having the second conductivity type formed in a surface layer of the fourth semiconductor layer, and connected with the third power supply wiring; and
- a sixth diffusion layer formed in a surface layer of the fourth semiconductor layer, wherein the gate electrode is formed in upper layers of the third semiconductor layer and the fourth semiconductor layer, wherein the fifth diffusion layer and the sixth diffusion layer are arranged to sandwich a region of the fourth semiconductor layer covered with the gate electrode, and wherein the second power supply potential is supplied from the third power supply wiring to the fifth diffusion layer.

11. The semiconductor device according to claim 6,
wherein the second direction is a direction orthogonal to the first direction.

* * * * *